US009846826B2

(12) United States Patent
Nakamura

(10) Patent No.: US 9,846,826 B2
(45) Date of Patent: Dec. 19, 2017

(54) IMAGE PROCESSING TO GENERATE A TONE CURVE FOR PROCESSING AN IMAGE BY ASSOCIATING A MODEL PARAMETER OF THE IMAGE WITH ANOTHER MODEL PARAMETER OF A REFERENCE IMAGE

(71) Applicant: Satoshi Nakamura, Kanagawa (JP)

(72) Inventor: Satoshi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/317,273

(22) Filed: Jun. 27, 2014

(65) Prior Publication Data

US 2015/0002904 A1    Jan. 1, 2015

(30) Foreign Application Priority Data

Jun. 28, 2013  (JP) ................................. 2013-137460

(51) Int. Cl.
| | | |
|---|---|---|
| *G06K 15/02* | (2006.01) | |
| *G06T 5/40* | (2006.01) | |
| *H04N 1/407* | (2006.01) | |
| *G06T 5/00* | (2006.01) | |

(52) U.S. Cl.
CPC .......... *G06K 15/1872* (2013.01); *G06T 5/009* (2013.01); *G06T 5/40* (2013.01); *H04N 1/407* (2013.01); *H04N 1/4074* (2013.01)

(58) Field of Classification Search
CPC ............................ G06K 15/1872; G06T 5/009
See application file for complete search history.

(56) References Cited

U.S. PATENT DOCUMENTS

| | | |
|---|---|---|
| 6,345,128 B1 | 2/2002 | Stokes |
| 6,346,994 B1 | 2/2002 | Inoue |
| 2002/0171852 A1 | 11/2002 | Zhang et al. |
| 2005/0073724 A1 | 4/2005 | Maltz |
| 2005/0169555 A1 | 8/2005 | Hasegawa |
| 2006/0227396 A1 | 10/2006 | Sugimoto et al. |

(Continued)

FOREIGN PATENT DOCUMENTS

| | | |
|---|---|---|
| JP | 2874657 | 1/1999 |
| JP | 11-317872 | 11/1999 |

(Continued)

OTHER PUBLICATIONS

Extended European Search Report dated Nov. 21, 2014 in Patent Application No. 14174736.0.

*Primary Examiner* — Christopher D Wait
(74) *Attorney, Agent, or Firm* — Oblon, McClelland, Maier & Neustadt, L.L.P.

(57) ABSTRACT

An image processing apparatus includes an image analyzing unit, a tone-curve generating unit, and an image correcting unit. The image analyzing unit acquires a model parameter by modeling data distribution of an image with a probability distribution model. The tone-curve generating unit generates a tone curve on the basis of control information in which the model parameter acquired by modeling the data distribution of the image to be processed is associated with a target value of the model parameter. The image correcting unit corrects the image to be processed by using the generated tone curve.

18 Claims, 16 Drawing Sheets

(56) References Cited

U.S. PATENT DOCUMENTS

| | | | |
|---|---|---|---|
| 2007/0081721 A1* | 4/2007 | Xiao | G06T 5/009 382/167 |
| 2007/0133062 A1* | 6/2007 | McCandlish | G06T 5/40 358/3.27 |
| 2010/0226547 A1* | 9/2010 | Criminisi | G06K 9/38 382/128 |
| 2011/0292246 A1* | 12/2011 | Brunner | G06T 5/009 348/231.99 |

FOREIGN PATENT DOCUMENTS

| | | |
|---|---|---|
| JP | 2006-098614 | 4/2006 |
| JP | 2007-067907 | 3/2007 |
| JP | 2009-182599 | 8/2009 |
| JP | 2010-130399 | 6/2010 |
| JP | 4533330 | 6/2010 |
| JP | 4900373 | 1/2012 |
| WO | WO 96/09717 A1 | 3/1996 |

\* cited by examiner (a)

(b)

US 9,846,826 B2

IMAGE PROCESSING TO GENERATE A TONE CURVE FOR PROCESSING AN IMAGE BY ASSOCIATING A MODEL PARAMETER OF THE IMAGE WITH ANOTHER MODEL PARAMETER OF A REFERENCE IMAGE

CROSS-REFERENCE TO RELATED APPLICATIONS

The present application claims priority to and incorporates by reference the entire contents of Japanese Patent Application No. 2013-137460 filed in Japan on Jun. 28, 2013.

BACKGROUND OF THE INVENTION

1. Field of the Invention

The present invention relates to an image processing apparatus, an image forming system, and a computer program product.

2. Description of the Related Art

There is known a technique for performing a tone conversion using a tone curve to correct the tone of an image. The tone curve is a curve (or a straight line in some cases) in which output tones assigned to respective input tones are defined. By modifying the shape of this curve, a specific range of tones can be compressed or expanded. In general, a tone curve is defined by a few points, and these points are called control points. A tone curve is obtained by interpolation between control points to thereby draw the curve. A tone curve is widely used for the purpose of correcting an image because the brightness, contrast, and color balance, etc. of an image can be collectively corrected by using the tone curve.

A tone curve is usually generated manually; however, there are problems that there is a high degree of freedom in the generation of a tone curve, and high skill is required to appropriately generate a tone curve. For example, in a case of generating separate RGB tone curves for respective channels of an RGB image that are each expressed in 256 tones, at most 768 control points can be set. Furthermore, from the perspective of preventing collapse of an image, it is necessary to set control points to avoid blocked up shadows, blown out highlights, and tone jump, etc. To generate an optimum tone curve by setting a lot of control points appropriately, a user needs to be skilled or take a process of trial and error.

Furthermore, even if an optimum tone curve for a certain image can be generated, an optimum tone curve depends on a feature of an image; therefore, it is difficult to use a previously-generated tone curve for another image. For example, assume that images of the same scene are taken with different exposures, and a slightly dark image and a very dark image are obtained. When tone conversion is performed on these images by using the same tone curve for making a whole image brighter, it is easy to imagine that if a tone curve suitable for the former image is applied to the latter image, the latter image will not become sufficiently bright; on the other hand, if a tone curve suitable for the latter image is applied to the former image, the former image will become too bright. Furthermore, if an intermediate tone curve between two tone curves suitable for the images is used, it can be easily imagined that optimal results for both will not be obtained.

Therefore, how to generate an optimum tone curve for an image to be processed (hereinafter, referred to as a "processing object image") and how to achieve the generation of the tone curve easily are important issues.

For example, a technology disclosed in Japanese Patent No. 2874657 is known as a conventional technology for easily performing image correction using a tone curve. In the technology disclosed in Japanese Patent No. 2874657, a correction pattern, which is a set of pieces of control information for highlight, medium tone, and shadow portions of an image, is stored to be associated with a color-related defect pattern. Then, when a user selects an arbitrary correction pattern and specifies a correction amount, a tone curve is calculated from control information for the selected correction pattern and the specified correction amount, and color conversion processing is performed on all pixels by use of the calculated tone curve.

However, in the conventional technology disclosed in Japanese Patent No. 2874657, it is necessary to select a correction pattern to be the basis of a tone curve from among multiple correction patterns and specify a correction amount. Therefore, an unskilled user cannot determine which correction pattern he/she should select and how much correction amount he/she should specify to calculate an optimum tone curve for correcting a processing object image, and still has to take a process of trial and error. Furthermore, in the conventional technology disclosed in Japanese Patent No. 2874657, a tone curve is calculated on the basis of a correction pattern prepared in advance; therefore, an optimum tone curve for a processing object image cannot always be calculated.

In view of the above, there is a need to provide an image processing apparatus, image forming system, and computer program product capable of easily generating an optimum tone curve for a processing object image.

SUMMARY OF THE INVENTION

It is an object of the present invention to at least partially solve the problems in the conventional technology.

An image processing apparatus includes: an image analyzing unit that acquires a model parameter by modeling distribution of pixel values of an image with a probability distribution model; a tone-curve generating unit that generates a tone curve on the basis of control information in which the model parameter acquired from the image to be processed is associated with a target value of the model parameter; and an image correcting unit that corrects the image to be processed by using the tone curve.

In an image forming system, an image processing apparatus and an image forming apparatus are connected so as to be able to communicate with each other. The image processing apparatus includes: an image analyzing unit that acquires a model parameter by modeling distribution of pixel values of an image with a probability distribution model; a tone-curve generating unit that generates a tone curve on the basis of control information in which the model parameter acquired from the image to be processed is associated with a target value of the model parameter; and an image correcting unit that corrects the image to be processed by using the tone curve. The image forming apparatus includes an image printing unit that prints out the image to be processed corrected by the image processing apparatus.

A computer program product includes a non-transitory computer-usable medium having computer-readable program codes embodied in the medium. The program codes when executed cause a computer to realize: a function of acquiring a model parameter by modeling distribution of pixel values of an image with a probability distribution model; a function of generating a tone curve on the basis of control information in which the model parameter acquired from the image to be processed is associated with a target value of the model parameter; and a function of correcting the image to be processed by using the tone curve.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
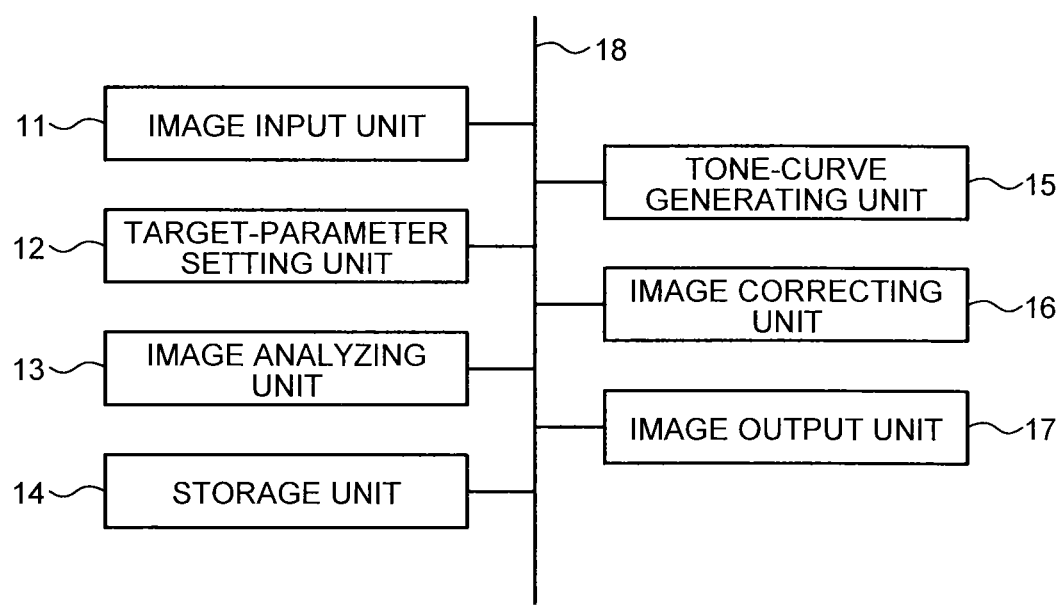
FIG. 1 is a functional block diagram showing a configuration of an image processing apparatus according to a first embodiment.

Exemplary embodiments of an image processing apparatus, image forming system, and computer program product according to the present invention will be explained below.

Outline

An image processing apparatus according to any of the present embodiments models distribution of pixel values (hereinafter, referred to as "data distribution") of a processing object image with a probability distribution model, and acquires a model parameter. Then, the image processing apparatus generates control information by associating the acquired model parameter with a target parameter which is a target value of the model parameter, and generates a tone curve on the basis of the control information.

By modeling the data distribution of the processing object image, a feature of the processing object image can be automatically extracted. As an example, the data distribution of the processing object image is modeled so as to be categorized into three classes: highlight, medium tone, and shadow. Here, the medium tone means the tone in the range between the tone of the highlight and the tone of the shadow. In this case, a model parameter corresponding to each class represents a feature of the class in the image (such as the brightness and degree of blown-out of a highlight portion, the darkness and degree of blocked-up of a shadow portion, and the average brightness of a whole image on the basis of a medium tone portion).

By checking the model parameter acquired from the processing object image (the feature of the processing object image) against the target parameter which is a target value of the model parameter (a feature of a target image), a direction for how to correct the processing object image is determined.

For example, it shall be preferable that the highlight portion is made as bright as possible without losing the tone, the shadow portion is made as dark as possible without losing the tone, and the medium tone portion is made slightly brighter while using a dynamic range to the maximum. The target parameter is set in advance, for example, so as to meet these conditions.

It can be determined that If a processing object image is dark and low in contrast, the contrast is increased by correcting a portion of the processing object image categorized as highlight to be made brighter, a portion categorized as shadow to be made darker, and a portion categorized as medium tone to be made brighter, thereby making the image a better image. A tone curve is generated by using the direction for the correction of the processing object image as control information, and thereby a tone curve capable of achieving an intended correction can be generated. Incidentally, the target parameter can be any parameter as long as the parameter represents a feature of a target image; for example, the one selected from among multiple candidate target parameters prepared in advance can be used as a target parameter. Furthermore, a reference image, which is an image having a target feature, can be modeled in the same manner as the processing object image, and an obtained model parameter can be used as a target parameter.

In this manner, the image processing apparatus according to any of the present embodiments models data distribution of a processing object image, thereby automatically extracting a feature of the processing object image, and generates a tone curve by using, as control information, the direction for the correction that makes the feature of the processing object image closer to a feature of a target image. Therefore, even an unskilled user can easily generate an optimum tone curve for the processing object image without taking a process of trial and error like the conventional technology.

The image processing apparatus according to any of the present embodiments can adopt a hardware configuration using a general computer that includes, for example, a control unit such as a CPU, a storage unit such as a ROM or a RAM, and an external storage unit such as an HDD or a CD drive unit. Then, the control unit such as a CPU executes a predetermined program using the storage unit, and thereby functions of performing the above-described modeling of an image, generation of a tone curve, and correction of the image by using the tone curve, etc. can be realized. Furthermore, part or all of the above-described functions of the image processing apparatus according to any of the present embodiments can be realized by using dedicated hardware such as an ASIC or an FPGA.

Specific embodiments will be explained in detail below with reference to accompanying drawings.

First Embodiment

First, an image processing apparatus according to a first embodiment is explained. In the first embodiment, the explanation is made on the assumption that a processing object image is a gray scale image. Data distribution of the processing object image treated in the first embodiment is one-dimensional distribution, so a model parameter to be described later is explained as being one-dimensional (a scalar quantity).

FIG. 1 is a functional block diagram showing a configuration of the image processing apparatus according to the first embodiment. As shown in FIG. 1, the image processing apparatus according to the first embodiment includes an image input unit 11, a target-parameter setting unit 12, an image analyzing unit 13, a storage unit 14, a tone-curve generating unit 15, an image correcting unit 16, an image output unit 17, and a bus 18 that connects these units to one another.

The image input unit 11 is to input a processing object image specified by a user. The processing object image input through the image input unit 11 is transmitted to the storage unit 14 via the bus 18 and temporarily stored in the storage unit 14.

The target-parameter setting unit 12 sets a target parameter representing a feature of a target image. The target parameter set by the target-parameter setting unit 12 is transmitted to the storage unit 14 via the bus 18 and temporarily stored in the storage unit 14.

The image analyzing unit 13 retrieves a processing object image from the storage unit 14, and acquires a model parameter by modeling data distribution of the processing object image with a probability distribution model. The model parameter acquired from the processing object image is transmitted to the storage unit 14 via the bus 18 and temporarily stored in the storage unit 14.

The storage unit 14 temporarily stores therein a processing object image input through the image input unit 11, a target parameter set by the target-parameter setting unit 12, a model parameter acquired from the processing object image by the image analyzing unit 13, a tone curve generated by the tone-curve generating unit 15, the processing object image corrected by the image correcting unit 16, and so on.

The tone-curve generating unit 15 retrieves a model parameter acquired from a processing object image and a target parameter, and generates control information by associating the model parameter with the target parameter. Then, the tone-curve generating unit 15 generates a tone curve used in correction of the processing object image on the basis of the generated control information. The tone curve generated by the tone-curve generating unit 15 is transmitted to the storage unit 14 via the bus 18 and temporarily stored in the storage unit 14.

The image correcting unit 16 retrieves a processing object image and a tone curve from the storage unit 14, and corrects the processing object image by applying the tone curve to the processing object image. The processing object image corrected by the image correcting unit 16 is transmitted to the storage unit 14 via the bus 18 and temporarily stored in the storage unit 14.

The image output unit 17 reads out a corrected processing object image from the storage unit 14, and outputs the corrected processing object image to a predetermined output destination or an output destination specified by a user.

Figure 2:
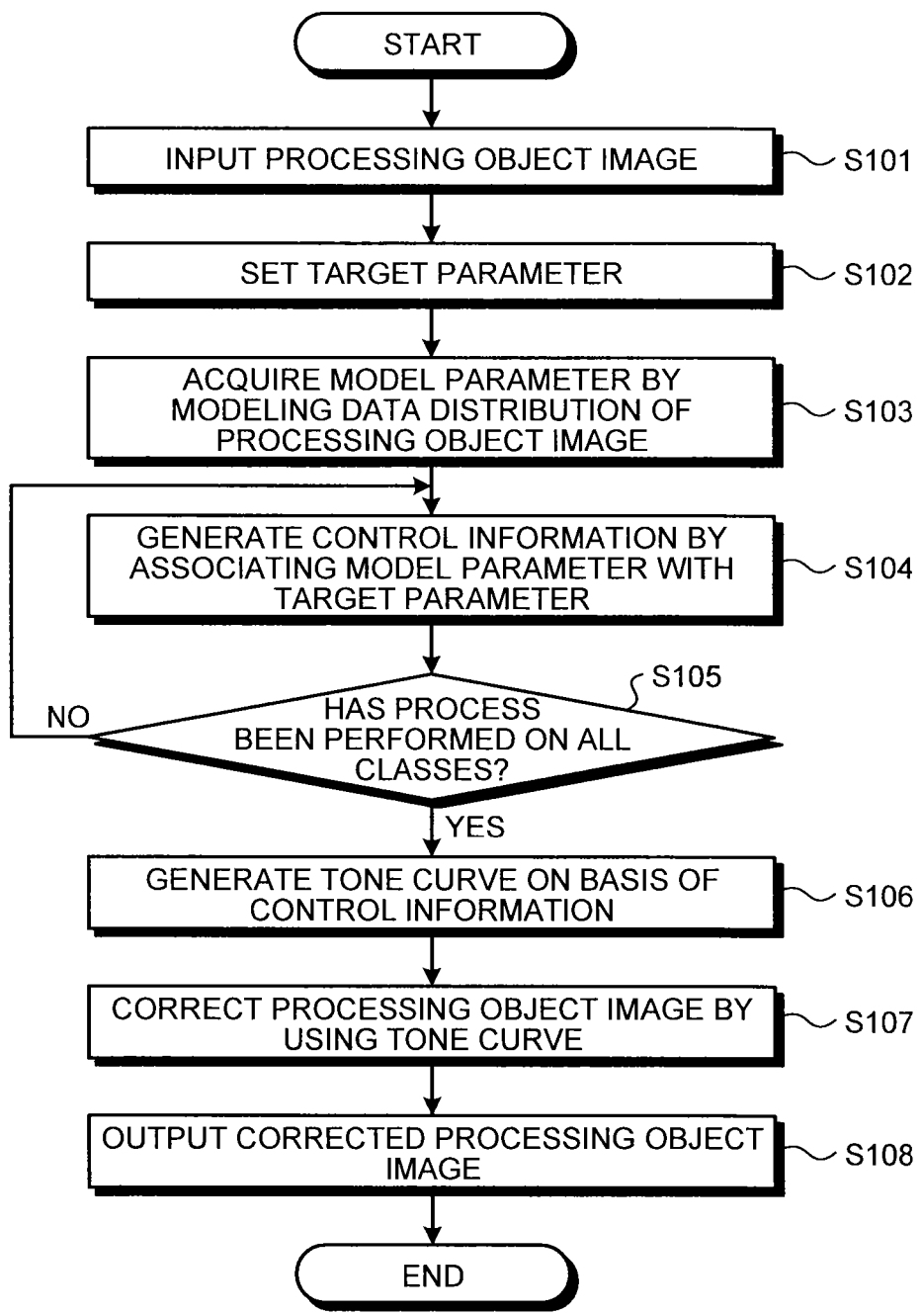
FIG. 2 is a flowchart illustrating operation of the image processing apparatus according to the first embodiment.

FIG. 2 is a flowchart illustrating operation of the image processing apparatus according to the first embodiment. A process performed by the above-described units is specifically explained below in line with the flowchart shown in FIG. 2.

First, a processing object image specified by a user is input through the image input unit 11 (Step S101). The input of the processing object image can be performed by reading out the image stored in, for example, recording media, such as a CD, a DVD, and a hard disk, or network storage, or can be performed by causing an image reading unit such as a scanner (not shown) to read out the image from a sheet of an original or a film.

Next, the target-parameter setting unit 12 sets a target parameter representing a feature of a target image (Step S102). The target parameter is a set of values set for respective classes used in categorization of data distribution. That is, the number of values included in a target parameter set with respect to one processing object image coincides with the number of mixtures in modeling of the data distribution of the processing object image. Therefore, when the data distribution of the processing object image is modeled so as to be categorized into three classes: highlight, medium tone, and shadow, a target parameter vref consisting of a value vhref for highlight, a value vmref for medium tone, and a value vlref for shadow is set.

The feature of the image used in the target parameter is, for example, the average and/or variance of pixel values. Besides these, the average and/or variance of a differential image obtained by differentiating the image can be used. Incidentally, the target parameter can be either one value or a set of multiple values per class. For example, only the average of pixel values can be used, or both the average and variance of pixel values can be used in pairs. If the average and variance of pixel values are used in pairs, the target parameter is a collection of as many pairs of averages and variances as the number of classes.

The target parameter can be either the unique one set in advance as a feature of a preferred image or the one selected from among multiple candidate target parameters prepared in advance. Furthermore, the target parameter can be the one given from outside as additional information of the processing object image. Moreover, a reference image, which has been input together with the processing object image by user specification, can be modeled in the same manner as the processing object image, and an obtained model parameter can be used as the target parameter. Furthermore, a reference image similar to the processing object image or a reference image specified by a user can be selected from among multiple candidate reference images prepared in advance, and the selected reference image can be modeled in the same manner as the processing object image, and an obtained model parameter can be used as the target parameter.

Next, the image analyzing unit 13 acquires a model parameter by modeling the data distribution of the processing object image input at Step S101 with a probability distribution model (Step S103). Modeling the data distribution with a probability distribution model means finding a probability distribution model to which the data distribution is approximated. The probability distribution model used in the modeling includes, for example, a Gaussian distribution model and an exponential distribution model. Which probability distribution model is to be used to model the data distribution of the processing object image may be determined according to the shape of actual data distribution. Furthermore, the probability distribution model used in the modeling can be either a single model (a simple distribution) or a mixed model (a mixture distribution) in which multiple different single models are linearly combined. Incidentally, a modeling method using a simple Gaussian distribution or a mixture Gaussian distribution is widely known; therefore, only the outline is described here. Furthermore, even in the case of using an exponential distribution, the same approach as a Gaussian distribution can be used basically, so the detailed description is omitted.

An image treated in the first embodiment is a gray scale image, so color space is one-dimensional space. Therefore, the image analyzing unit 13 can perform modeling of the data distribution of the processing object image, for example, by the following procedure.

First, the image analyzing unit 13 tallies the number of pixels belonging to each tone of the processing object image, and creates a histogram. At this time, the image analyzing unit 13 can convert the number of pixels belonging to each tone into the ratio by dividing the number of pixels belonging to each tone by the number of all pixels if needed.

Then, the image analyzing unit 13 models the histogram with a single model or a mixed model. Here, it is assumed that the image analyzing unit 13 models the histogram with a Gaussian distribution. If the histogram is modeled with a simple Gaussian distribution, the average and variance of the histogram may be calculated. If the histogram is modeled with a mixture Gaussian distribution, the parameter may be updated by maximum likelihood estimation using, for example, an EM algorithm. As initial values in updating the model parameter by iterative calculation using an EM algorithm or the like, either a predetermined fixed value or a random value can be used. Furthermore, in clustering of a data aggregate, a similar data aggregate can be retrieved from recorded data aggregates which have been subjected to the clustering, and the initial value in updating the model parameter by iterative calculation can be determined on the basis of a model parameter used in the clustering of the similar data aggregate. The finally-obtained parameter is set as a model parameter.

When a Gaussian distribution is used in the modeling, as many pairs of averages and variances as the number of mixtures (the number of Gaussian distributions used in the modeling) are obtained. Therefore, modeling is made with a mixture Gaussian distribution of three Gaussian distributions, if the three classes are labeled as highlight, medium tone, and shadow, a model parameter vin consisting of three values: a value vhin for highlight, a value vmin for medium tone, and a value vlin for shadow is obtained. Just like the target parameter, the model parameter can be consisting of either one value or a set of multiple values per class. In the description below, only the average is used as a model parameter.

Incidentally, here, the histogram is created on the basis of the data distribution; however, creating the histogram is not imperative. This is because the average or variance of the data distribution can be directly calculated from data. Here, explanation is made on the assumption that the histogram is created, mainly from the perspective of visual understandability.

Figure 3A:
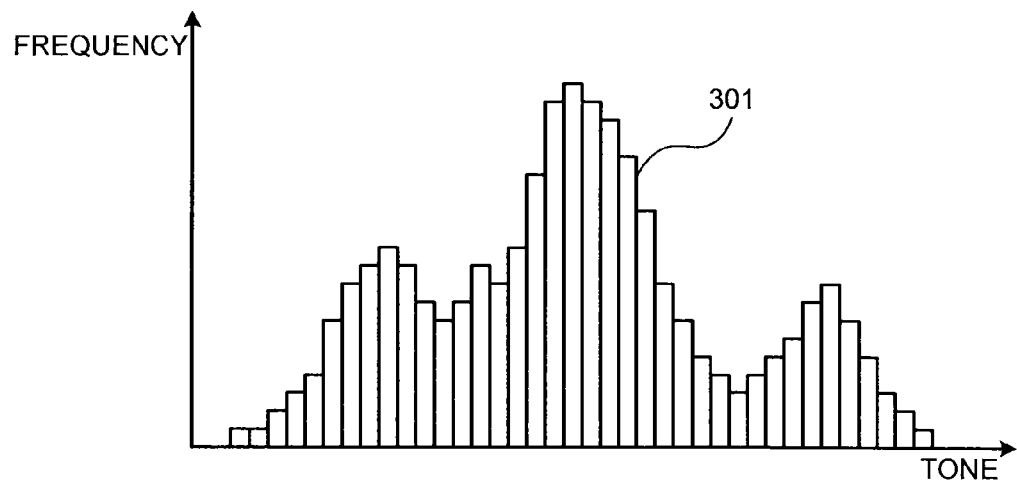
FIGS. 3A to 3C are diagrams illustrating an example of modeling of data distribution with three Gaussian distributions.
Figure 3B:
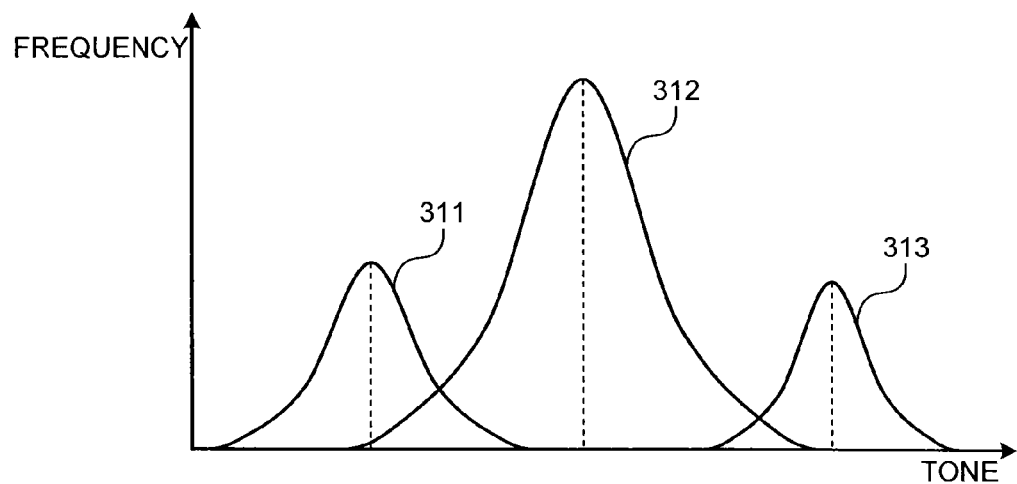
Figure 3C:
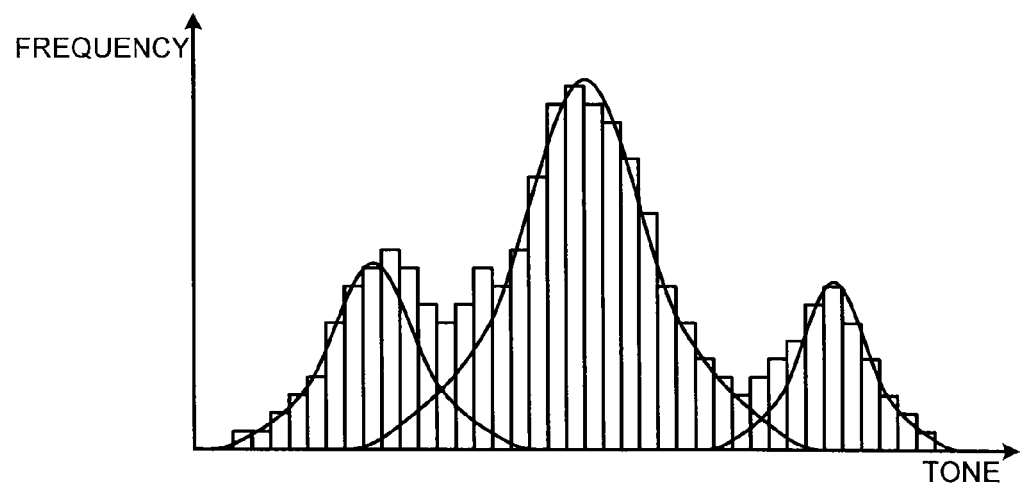

An example of modeling of the data distribution with three Gaussian distributions is explained with FIGS. 3A to 3C. FIG. 3A shows an example of a histogram created by using pixel values of the processing object image. The horizontal axis of the histogram indicates tone, and the vertical axis indicates frequency. Incidentally, here, the frequency is expressed in the ratio. By tallying the number of pixels of the processing object image with respect to each tone corresponding to a pixel value, a histogram 301 as shown in FIG. 3A is constructed. It shows that this histogram 301 is broadly composed of three peaks, and the peaks can be considered to correspond to distributions of shadow, medium tone, and highlight in order of increasing tone.

FIG. 3B shows a result of modeling the histogram 301 shown in FIG. 3A with three Gaussian distributions. If the histogram 301 can be successfully modeled with a Gaussian distribution 311 with an average a, a Gaussian distribution 312 with an average b, and a Gaussian distribution 313 with an average c, a model parameter (a, b, c) is obtained. FIG. 3C is superposition of FIG. 3A and FIG. 3B, and shows that the data distribution of the processing object image can be successfully approximated by the three Gaussian distributions. Incidentally, a model parameter of a Gaussian distribution is generally the average and the variance; however, in the present embodiment, only the average is used for the sake of simplification. As described above, both the average and the variance may be used.

Incidentally, in the example shown in FIGS. 3A to 3C, the histogram 301 having three peaks corresponding to three classes: shadow, medium tone, and highlight is obtained; however, the shape of a histogram created from a processing object image may vary. For example, a unimodal histogram, a bimodal histogram, and a multimodal histogram having four or more peaks may be obtained. Even in such cases, if data distribution of a processing object image is to be categorized into three classes: highlight, medium tone, and shadow, the data distribution is modeled with three Gaussian distributions.

Figure 4A:
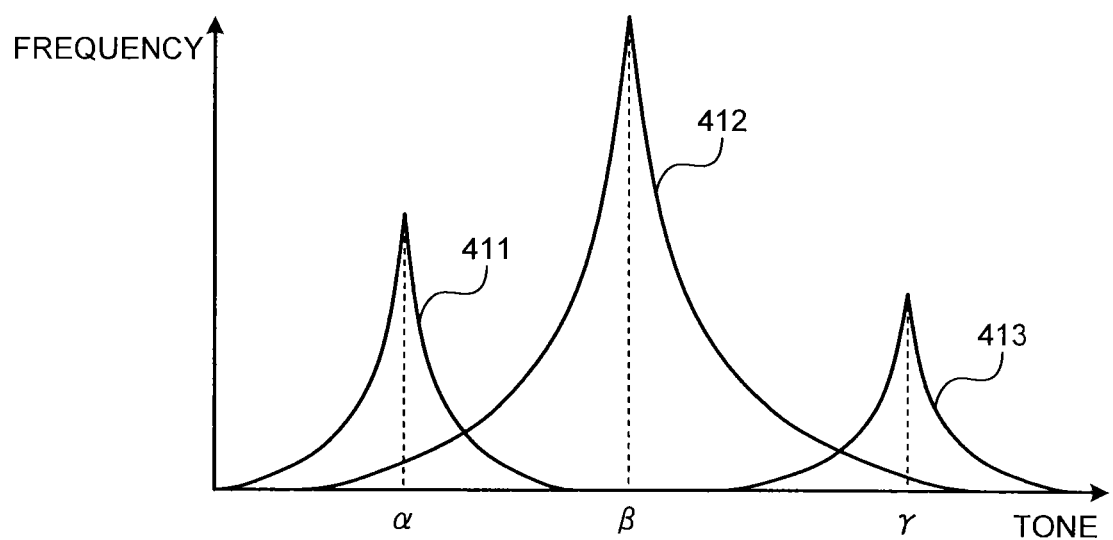
FIGS. 4A and 4B are diagrams illustrating an example of modeling of the data distribution with three exponential distributions.
Figure 4B:
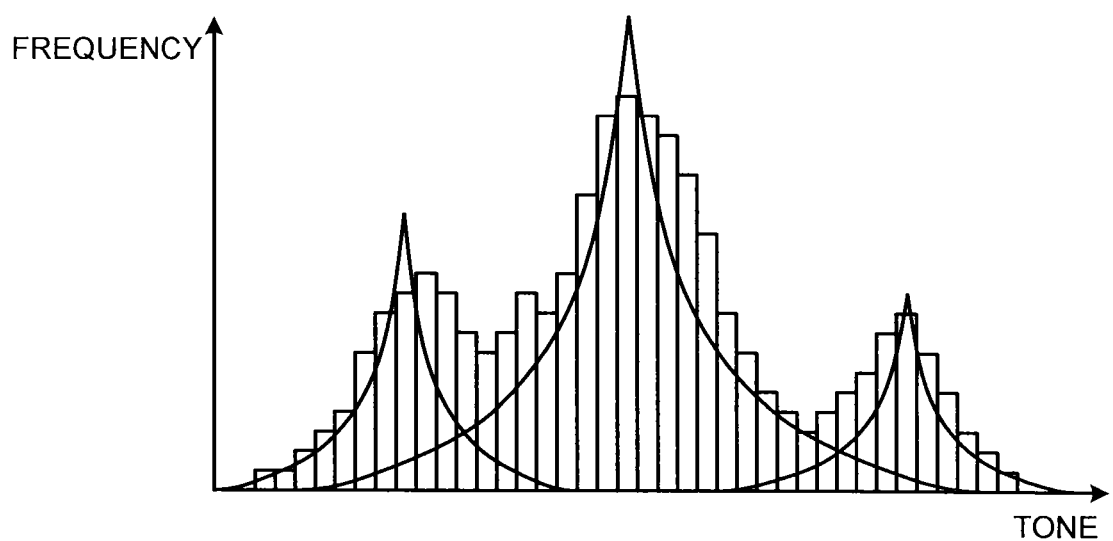

An example of modeling of the data distribution with three exponential distributions is explained with FIGS. 4A and 4B. FIG. 4A shows a result of modeling the histogram 301 shown in FIG. 3A with three exponential distributions. Incidentally, an exponential distribution is generally defined by the following equation (1); however, in the present embodiment, a combination of two exponential distributions, which are symmetric about the line of x=μ as defined by the following equation (2), is used, and this combination is referred to as one exponential distribution for the sake of convenience.

$$f(x; \lambda) = \begin{cases} \lambda e^{-\lambda x} & (x \geq 0) \\ 0 & (x < 0) \end{cases} \quad (1)$$

$$f(x;\lambda) = \begin{cases} \lambda e^{-\lambda(x-\mu)} & (x \geq \mu) \\ \lambda e^{-\lambda(\mu-x)} & (x < \mu) \end{cases} \quad (2)$$

If the histogram 301 can be successfully modeled with an exponential distribution 411 defined by $\lambda=\lambda 1$ and $\mu=\alpha$, an exponential distribution 412 defined by $\lambda=\lambda 2$ and $\mu=\beta$, and an exponential distribution 413 defined by $\lambda=\lambda 3$ and $\mu=\gamma$, a model parameter $((\alpha, \lambda 1), (\beta, \lambda 2), (\gamma, \lambda 3))$ is obtained. FIG. 4B is superposition of FIG. 3A and FIG. 4A, and shows that the data distribution of the processing object image can be successfully approximated by the three exponential distributions though not so successful as the case shown in FIG. 3C where the Gaussian distributions are used.

Next, the tone-curve generating unit 15 generates control information by associating the model parameter acquired by the modeling at Step S103 with the target parameter set at Step S102 (Step S104). This process at Step S104 is performed with respect to each of the classes into which the data distribution of the processing object image is categorized. That is, when the tone-curve generating unit 15 has generated control information corresponding to one class, the tone-curve generating unit 15 checks whether the process has been performed on all the classes (Step S105), and repeatedly performs the process at Step S104 until the process has been performed on all the classes (NO at Step S105). Specifically, the tone-curve generating unit 15 repeatedly performs the process of generating control information corresponding to a class by associating respective values assigned to the same labeled class in the model parameter and the target parameter on all the classes. For example, when the data distribution of the processing object image is categorized into three classes: highlight, medium tone, and shadow, three pieces of control information: control information (vhin, vhref), control information (vmin, vmref), and control information (vlin, vlref) are generated.

Then, the tone-curve generating unit 15 generates a tone curve for correcting the processing object image on the basis of the control information generated at Step S104 (Step S106). For example, the tone-curve generating unit 15 generates a tone curve for correcting the processing object image by performing interpolation using a predetermined function, with the control information generated at Step S104 as control points.

Examples of the predetermined function used in the interpolation include, for example, a linear function, a B-spline function, and a cubic spline function, etc. The calculation cost can be kept down if the linear function is used; however, the slope suddenly changes across the control points, and tones are likely to be discontinuous. On the other hand, the cubic spline function is a method to connect control points by a cubic function, and a smooth curve is obtained. Furthermore, in the B-spline function, a curve having a gentler slope than that in the cubic spline function is obtained because the curve does not pass through control points. Incidentally, if both ends of tones are not included in the control information used as control points in the interpolation, it is preferable to appropriately add control points corresponding to the ends of tones. For example, when a tone curve of 256 tones is designed, by adding (0, 0) and (255, 255) as control points, a tone curve that covers the entire tone range can be generated. On the other hand, if a dynamic range is limited, regarding values for the output tone (the target parameter), (0, 10) or (255, 245) is appropriately set, for example.

Figure 5:
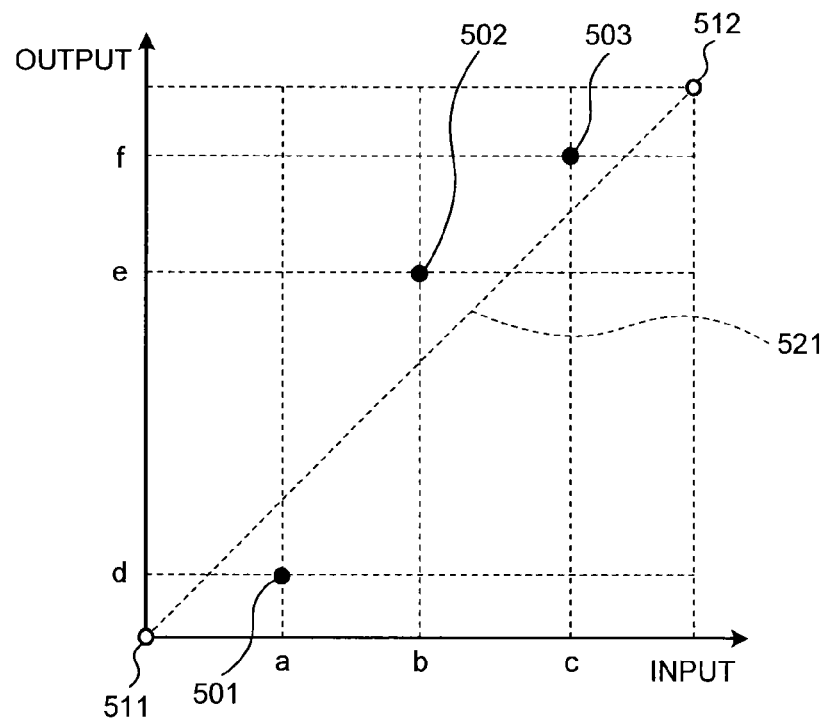
FIG. 5 is a diagram showing a state where control information is arranged as control points in a coordinate system of a tone curve.

FIG. 5 is a diagram showing a state where control information is arranged as control points in a coordinate system of a tone curve. The horizontal axis of the coordinate system shown in FIG. 5 indicates input tone, and the vertical axis indicates output tone. Furthermore, a diagonal line 521 is a straight line on which an input tone coincides with an output tone. Points 501, 502, and 503 are control points representing the control information arranged in the coordinate system of the tone curve. A model parameter here is averages (a, b, c) of three Gaussian distributions in a mixture Gaussian distribution with which the data distribution of the processing object image is modeled, and a target parameter is target values (d, e, f) of respective averages of the Gaussian distributions. Therefore, by associating averages of a Gaussian distributions belonging to corresponding classes with respective target values thereof, control information (a, d), (b, e), and (c, f) are obtained. The control points 501, 502, and 503 are plotted in the coordinate system of the tone curve with the control information as coordinate values. Incidentally, in this example, there are no control points on the ends of both input and output ranges, so the shape of the tone curve is unfixed in an area of input tones lower than a and higher than c. Therefore, control points 511 and 512 corresponding to both ends of tones are added as described above.

Figure 6:
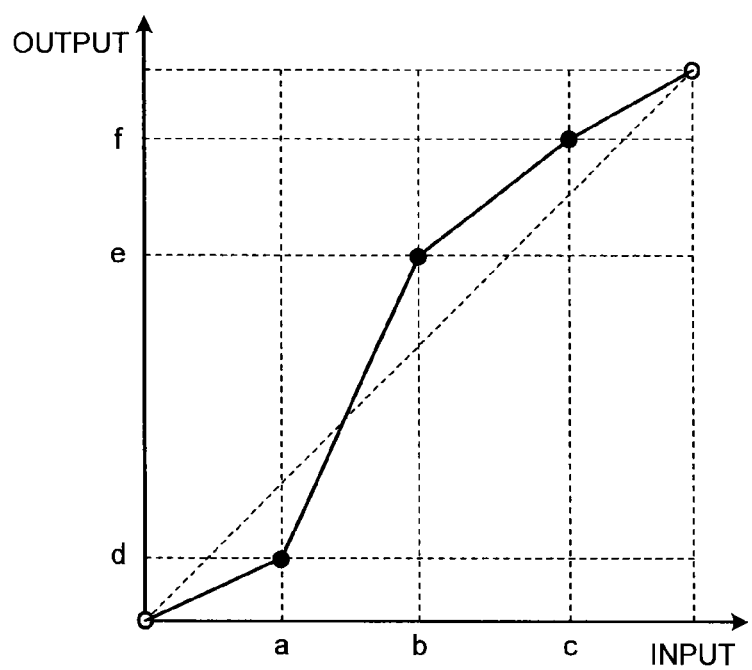
FIG. 6 is a diagram showing an example of a tone curve generated by linear interpolation with the control points shown in FIG. 5.

FIG. 6 is a diagram showing an example of a tone curve generated by linear interpolation with the control points shown in FIG. 5. When a tone curve is generated by linear interpolation, the tone curve can be generated very easily. However, the slope of a line may suddenly changes in the vicinity of the control points. Therefore, in the processing object image corrected by using the tone curve, smoothness of the tone may be spoiled. In the example shown in FIG. 6, the slope of the line suddenly changes, for example, near a on the horizontal axis; therefore, when the processing object image is corrected by using this tone curve, there is a risk that the smoothness of the tone is spoiled near the pixel value a in a corrected image.

Figure 7:
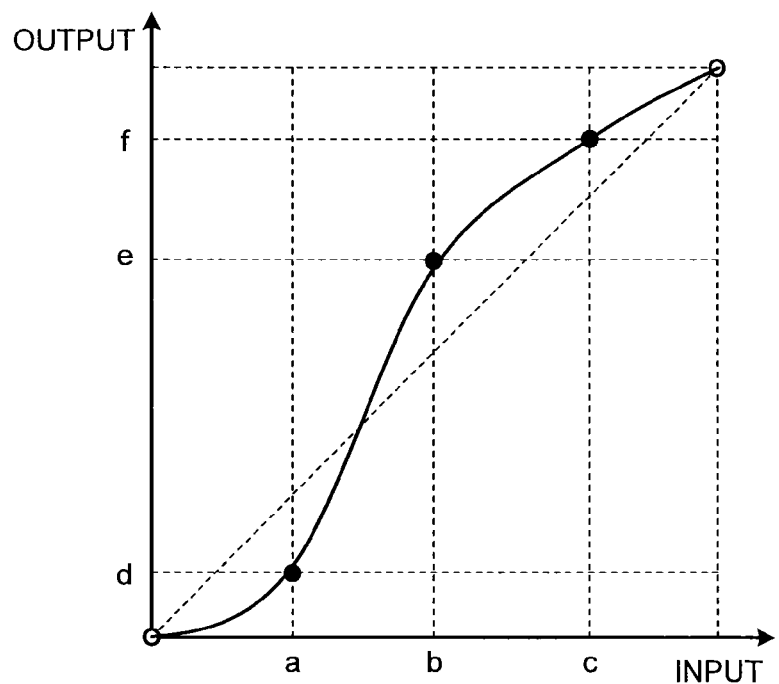
FIG. 7 is a diagram showing an example of a tone curve generated by cubic spline interpolation with the control points shown in FIG. 5.

FIG. 7 is a diagram showing an example of a tone curve generated by cubic spline interpolation with the control points shown in FIG. 5. The tone curve generated by cubic spline interpolation is shaped into a smooth continuous curve as compared with the tone curve generated by linear interpolation shown in FIG. 6, and it is easy to imagine that smoothness of tone is spoiled in the processing object image corrected by using the tone curve shown in FIG. 7. However, there is a portion of the curve having a steep slope, for example, as in between a and b on the horizontal axis, and tone jump may occur in this area.

Figure 8:
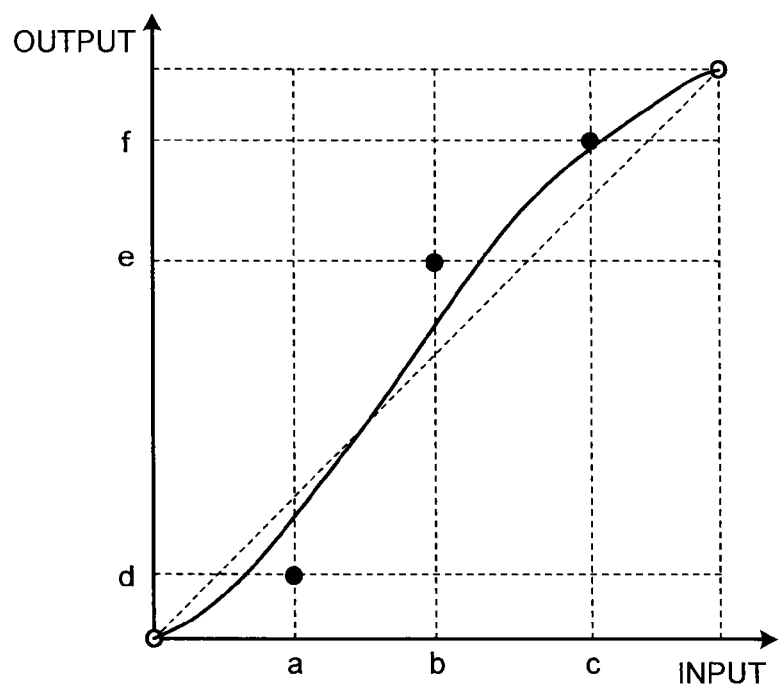
FIG. 8 is a diagram showing an example of a tone curve generated by B-spline interpolation with the control points shown in FIG. 5.

FIG. 8 is a diagram showing an example of a tone curve generated by B-spline interpolation with the control points shown in FIG. 5. We can see the tone curve generated by B-spline interpolation has a gentler slope while keeping the smoothness of the curve as compared with the tone curve generated by cubic spline interpolation shown in FIG. 7. Accordingly, it turns out that the above-described concern about tone jump is eased. Meanwhile, as characteristics of B-spline interpolation, the curve obtained by the interpolation does not always pass through control points other than endpoints; therefore, a change in tones is smaller than that in the cubic spline interpolation.

Which interpolation method a tone curve is generated by is appropriately determined from viewpoints of the calculation cost, the smoothness of tones, and the effect of tone conversion, etc. according to purpose of the correction. Incidentally, only three interpolation methods are described as examples of an interpolation method used in the generation of a tone curve; however, a tone curve can be generated by appropriately using any of commonly-known interpolation methods and curve drawing methods regardless of whether the curve passes through control points. For example, a tone curve can be generated by using an nth-order spline curve (n≥1), an nth-order Bezier curve (n≥1), or Lagrange interpolation, etc.

Next, the image correcting unit 16 corrects the processing object image by using the tone curve generated at Step S106 (Step S107). Specifically, the image correcting unit 16 performs a tone conversion on the processing object image by using the tone curve. At this time, if a look-up table that describes correspondence between input tone and output tone defined by the tone curve is created in advance, and the tone conversion is performed by using this look-up table, the processing time can be reduced.

Next, the image output unit 17 outputs the processing object image corrected at Step S107 (Step S108). An output destination of the corrected processing object image is, for example, a display unit (not shown) on which the image is displayed, a storage unit such as an HDD in which the image is stored, or a printer that prints the image, etc.

As explained above with a specific example, the image processing apparatus according to the first embodiment generates a tone curve for correcting a processing object image on the basis of control information in which a model parameter obtained by modeling the data distribution of the processing object image is associated with a probability distribution model, with a target parameter which is a target value of the model parameter. Therefore, a user just specifies a processing object image, so that an optimum tone curve for the processing object image is generated; therefore, even an unskilled user can easily generate an optimum tone curve for a processing object image without taking a process of trial and error like the conventional technology.

Variation 1

In the above description, a processing object image is described as a gray scale image. However, even if a processing object image is a color image, a tone curve for correcting the color processing object image can be generated by the same process.

When a processing object image is a color image, after the processing object image is input at Step S101 in FIG. 2, a channel dividing unit (not shown) divides the processing object image into gray scale images for channels, and with respect to each of the channels separately, the processes at Steps S102 to S107 in FIG. 2 are performed. Then, after a channel combining unit (not shown) combines the gray scale images corrected with respect to each of the channels into a color image, an output object image corrected at Step S108 in FIG. 2 is output.

Incidentally, when a processing object image is a color image, instead of performing a process of correcting all the channels, a process of correcting only a specific channel can be performed. In this case, as for a target parameter for the color image, as many target parameters as the number of channels to be processed need to be set.

Variation 2

In the above description, out of the average and variance obtained as model parameters of a Gaussian distribution, only the average is used to generate a tone curve. However, in addition to the average, the variance can be also used to generate a tone curve.

For example, as can be seen from the three Gaussian distributions shown in FIG. 3B, the Gaussian distribution corresponding to medium tone has a higher peak and a wider foot than those of the other two Gaussian distributions. Therefore, it is preferable to generate a tone curve with a focus more on medium tone corresponding to this Gaussian distribution. In such a case, a tone curve focusing more on medium tone can be generated by the following method.

For example, the positions of control points set by using the averages of the Gaussian distributions can be corrected by using the variances of the Gaussian distributions. Specifically, for example, out of the three control points 501, 502, and 503 shown in FIG. 5, a control point corresponding to a Gaussian distribution having the largest variance, i.e., the control point 502 corresponding to medium tone of which the Gaussian distribution has the highest peak is fixed, and the positions of the other two control points 501 and 503 are corrected so as to get away from the control point 502.

As a method to correct the positions of the control points, for example, the control points can be moved along the horizontal axis in FIG. 5 or along the diagonal line 521, or the control points can be moved in the directions of the endpoints 511 and 512. An amount of movement of the control points can be, for example, a predetermined movement amount or a movement amount calculated according to the ratio or difference between variances of the two Gaussian distributions.

Furthermore, when control points are set by using the averages of the Gaussian distributions, and a tone curve is generated by interpolation with a combination of multiple interpolation methods, respective rates of the interpolation methods applied to the classes can be changed by using the variances of the Gaussian distributions corresponding to the classes. As an example, two tone curves whose curve lines between the control points 501 and 503 shown in FIG. 5 are interpolated by two interpolation methods: cubic spline interpolation and B-spline interpolation are generated, and a final tone curve is generated by combining these two tone curves weighted on the basis of the variances. Specifically, the two tone curves are weighted so that the weight added to the cubic spline interpolation is 1 at a control point corresponding to the Gaussian distribution having the largest variance, i.e., the control point 502 corresponding to medium tone of which the Gaussian distribution has the highest peak and also the weight added to the cubic spline interpolation gets lower with increasing distance from the control point 502 and the weight added to the B-spline interpolation gets higher relatively. Accordingly, significant tone conversion occurs near the control point 502; however, it is possible to generate a tone curve in which the degree of change is weakened with increasing distance from the control point 502, and it is possible to generate a tone curve with a combination of respective characteristics of the cubic spline interpolation and the B-spline interpolation.

Moreover, a tone curve can be also generated by using not only the variance of model parameters but also the variance of target parameters. For example, assume that when a focus is put on medium tone, the variance of model parameters is large, but the variance of target parameters is small. In this case, although the contrast of medium tone in a processing object image is high, it is preferable to suppress the contrast of medium tone in a corrected image. Therefore, the ratio of the variance of target parameters to the variance of model parameters is calculated, and, if the ratio is smaller than 1 (if the variance of model parameters is larger), for example, the positions of the two control points 501 and 503 other than the control point 502 corresponding to medium tone shown in FIG. 5 are corrected to be closer to the control point 502 corresponding to medium tone, and thereby the contrast of medium tone can be relatively decreased. Conversely, if the ratio of the variance of target parameters to the variance of model parameters is larger than 1 (if the variance of model parameters is smaller), the positions of the two control points 501 and 503 are corrected to be farther away from the control point 502 corresponding to medium tone, and thereby the contrast of medium tone can be relatively increased. In this case, control-point movement amounts can be recorded on, for example, a look-up table in advance, and a movement amount to be used can be selected from among the control-point movement amounts on the basis of the variances or the above-described variance ratio. Besides this, the length obtained by multiplying the distance from an adjacent control point by a value obtained by subtracting 1 from the ratio of the variance of target parameters to the variance of model parameters can be used as an amount of movement of a control point. In this case, if the variance ratio is 1, the adjacent control point is not moved; if the variance ratio is larger than 1, the adjacent control point is moved away; and if the variance ratio is smaller than 1, the adjacent control point is moved closer.

Variation 3

In the above description, data distribution of a processing object image is categorized into three classes: highlight, medium tone, and shadow, and the data distribution of the processing object image is modeled with three Gaussian distributions (a mixture Gaussian distribution that three Gaussian distributions are mixed). However, the number of classes into which data distribution of a processing object image is categorized, i.e., the number of models (the number of models mixed) used in modeling of the data distribution can be arbitrarily determined.

Figure 9A:
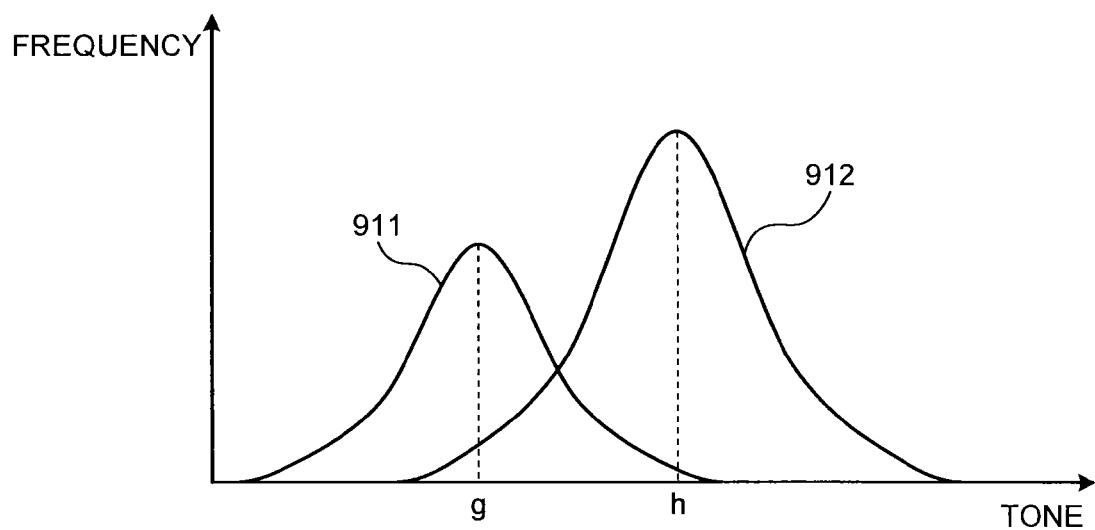
FIGS. 9A and 9B are diagrams illustrating an example of modeling of the data distribution with two Gaussian distributions.
Figure 9B:
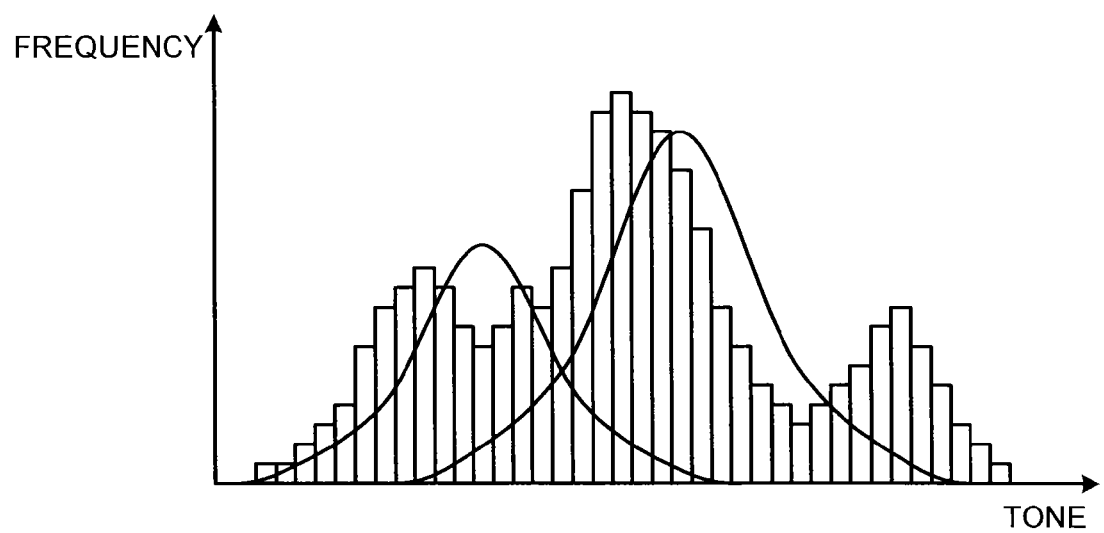

An example where the data distribution is modeled with two Gaussian distributions is shown in FIGS. 9A and 9B. FIG. 9A shows a result of modeling the histogram 301 shown in FIG. 3A with two Gaussian distributions. When the histogram 301 shown in FIG. 3A is modeled with two Gaussian distributions, as shown in FIG. 9A, a Gaussian distribution 911 with an average g and a Gaussian distribution 912 with an average h are obtained, and these substantially correspond to a dark area and a bright area in the processing object image. FIG. 9B is superposition of FIG. 3A and FIG. 9A. As compared with the case shown in FIG. 3C where three Gaussian distributions are used, the accuracy of approximation to the histogram is reduced; however, if the number of necessary classes is two, modeling is performed in this way.

Figure 10:
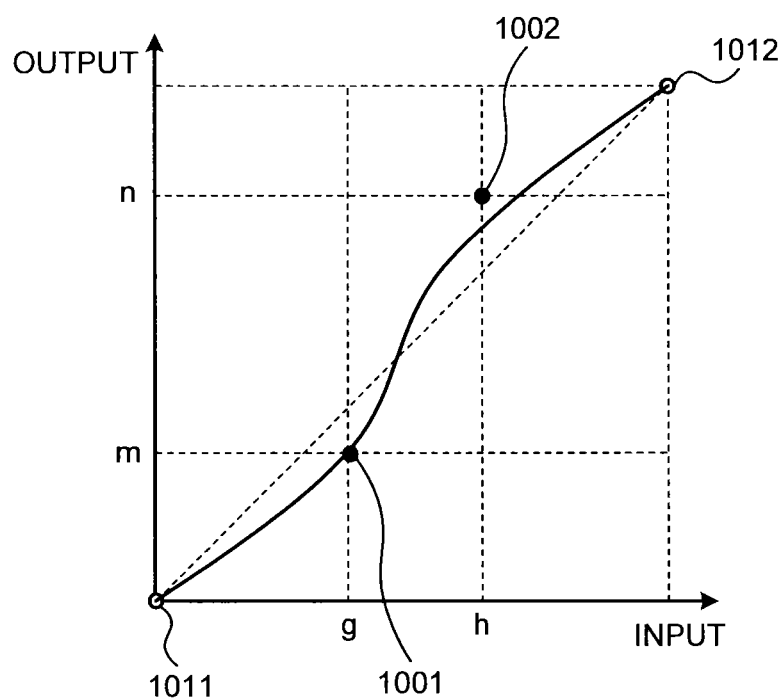
FIG. 10 is a diagram showing an example of a tone curve generated by B-spline interpolation with control points obtained by the modeling shown in FIGS. 9A and 9B.

FIG. 10 is a diagram showing an example of a tone curve generated by B-spline interpolation with control points obtained by the modeling shown in FIGS. 9A and 9B. As the data distribution has been modeled with two Gaussian distributions, two model parameters corresponding to the two Gaussian distributions are obtained, and as a result, two control points 1001 and 1002 are set in a coordinate system of a tone curve. A tone curve is generated by B-spline interpolation with four control points: these two control points 1001 and 1002 and endpoints 1011 and 1012, and thereby the tone curve shown in FIG. 10 is obtained.

Figure 11A:
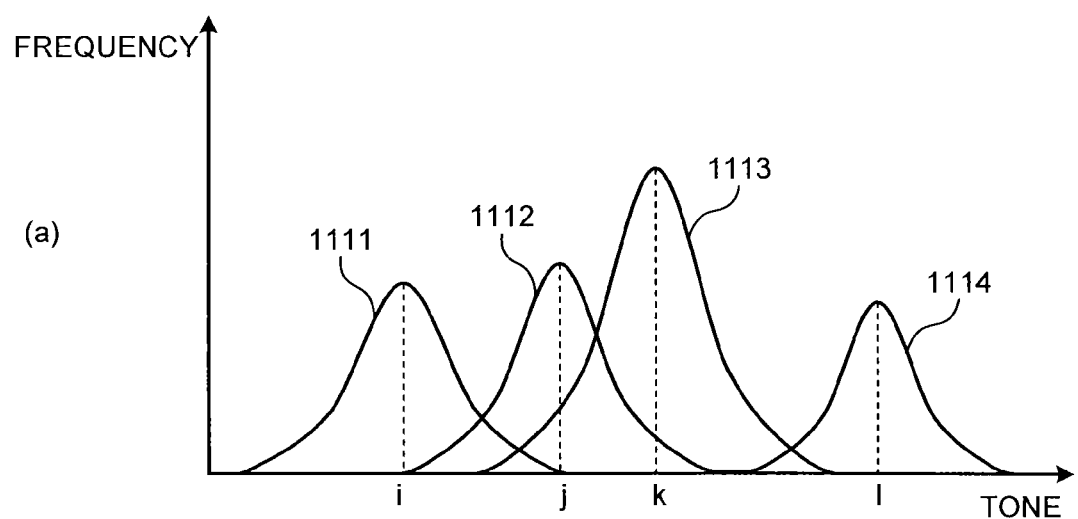
FIGS. 11A and 11B are diagrams illustrating an example of modeling of the data distribution with four Gaussian distributions.
Figure 11B:
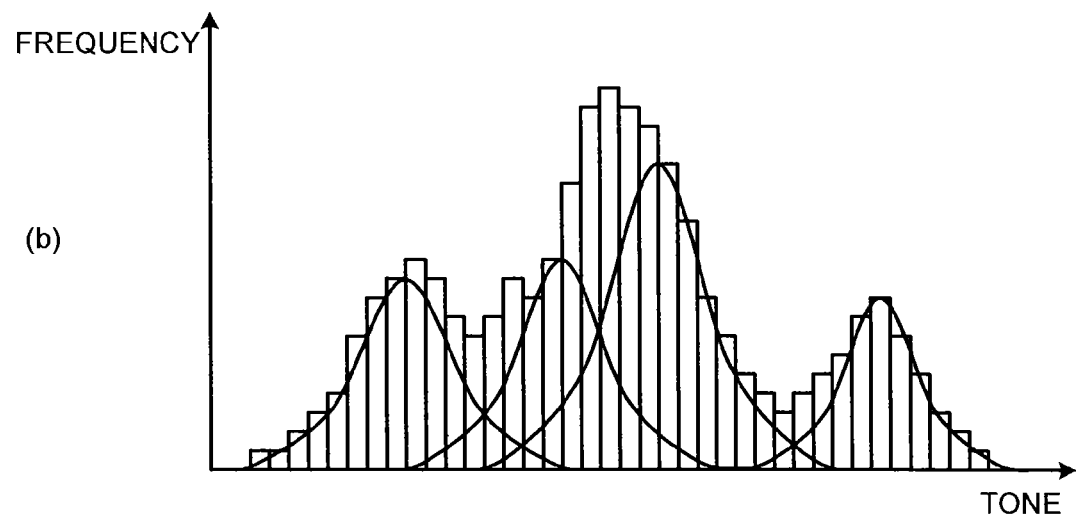

An example where the data distribution is modeled with four Gaussian distributions is shown in FIGS. 11A and 11B. FIG. 11A shows a result of modeling the histogram 301 shown in FIG. 3A with four Gaussian distributions. When the histogram 301 shown in FIG. 3A is modeled with four Gaussian distributions, as shown in FIG. 11A, a Gaussian distribution 1111 with an average i, a Gaussian distribution 1112 with an average j, a Gaussian distribution 1113 with an average k, and a Gaussian distribution 1114 with an average l are obtained, and these substantially correspond to a shadow area, a slightly dark area, a slightly bright area, and a highlight area in the processing object image. FIG. 11B is superposition of FIG. 3A and FIG. 11A. As compared with the case shown in FIG. 3C where three Gaussian distributions are used, the accuracy of approximation to the histogram is not so different.

Figure 12:
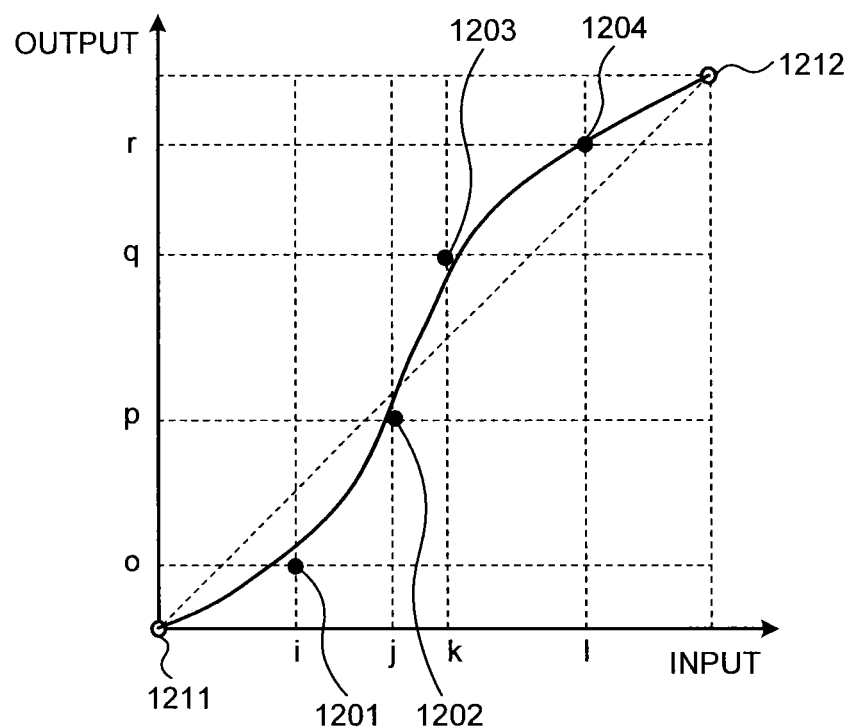
FIG. 12 is a diagram showing an example of a tone curve generated by B-spline interpolation with control points obtained by the modeling shown in FIGS. 11A and 11B.

FIG. 12 is a diagram showing an example of a tone curve generated by B-spline interpolation with control points obtained by the modeling shown in FIGS. 11A and 11B. As the data distribution has been modeled with four Gaussian distributions, four model parameters corresponding to the four Gaussian distributions are obtained, and as a result, four control points 1201, 1202, 1203, and 1204 are set in a coordinate system of a tone curve. A tone curve is generated by B-spline interpolation with six control points: these four control points 1201, 1202, 1203, and 1204 and endpoints 1011 and 1012, and thereby the tone curve shown in FIG. 12 is obtained.

There are described above an example where the data distribution of the processing object image is modeled with two Gaussian distributions and an example where the data distribution of the processing object image is modeled with four Gaussian distributions; in addition, the data distribution can be modeled with a simple Gaussian distribution, or the data distribution can be modeled with five or more Gaussian distributions. The number of models (the number of models mixed) used in modeling of the data distribution can be appropriately determined according to the purpose of modeling (such as the number of classes into which the data distribution is categorized) and the shape of actual data distribution (the shape of a histogram).

Second Embodiment

Subsequently, an image processing apparatus according to a second embodiment is explained. The second embodiment is an example where a processing object image is converted into a different color space and then corrected with a tone curve. Except for the color space conversion, the flow of basic processing is the same as the above-described first embodiment, so the second embodiment is explained below with a focus on parts characteristic of the second embodiment, and overlapping description with the first embodiment is appropriately omitted. Incidentally, unlike the first embodiment, the second embodiment is based on the premise that a processing object image is a color image (a multichannel image).

Figure 13:
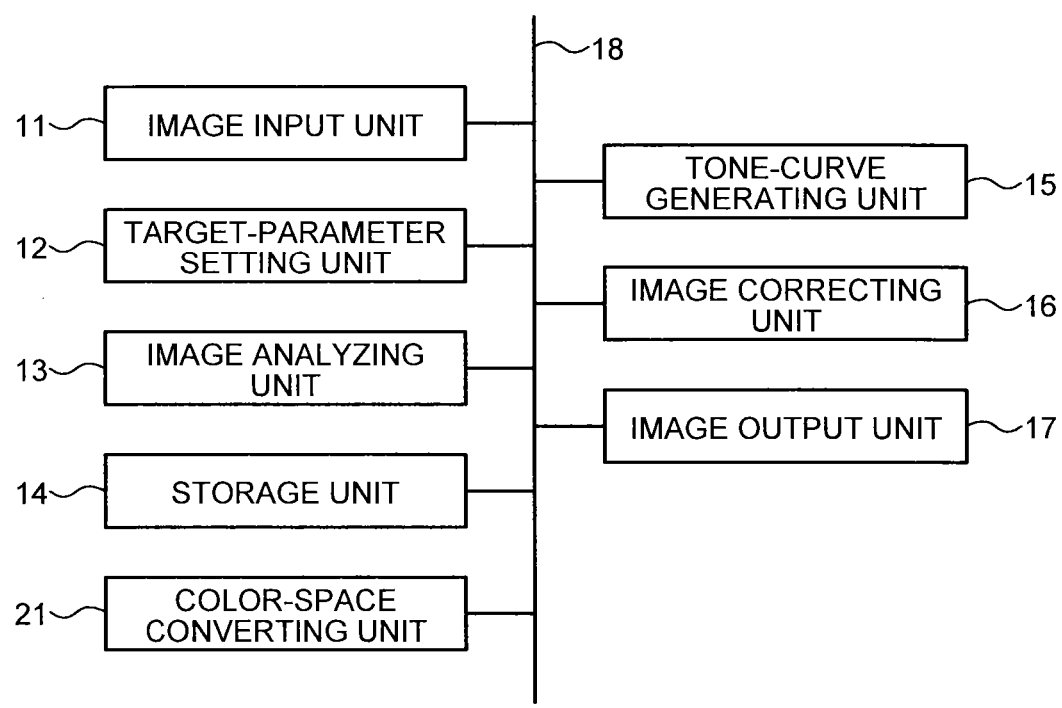
FIG. 13 is a functional block diagram showing a configuration of an image processing apparatus according to a second embodiment.

FIG. 13 is a functional block diagram showing a configuration of the image processing apparatus according to the second embodiment. As shown in FIG. 13, the configuration of the image processing apparatus according to the second embodiment is that a color-space converting unit 21 is added to the configuration of the image processing apparatus according to the first embodiment.

The color-space converting unit 21 reads out a processing object image input by the image input unit 11 from the storage unit 14, and converts the processing object image into a different color space from an original color space. The processing object image subjected to the color space conversion by the color-space converting unit 21 is transmitted to the storage unit 14 via the bus 18 and temporarily stored in the storage unit 14. In the second embodiment, the image analyzing unit 13 reads out this processing object image subjected to the color space conversion from the storage unit 14, and performs a process of modeling data distribution of the read processing object image. Furthermore, the image correcting unit 16 reads out the processing object image subjected to the color space conversion from the storage unit 14, and performs a correction (a tone conversion) on the read processing object image by using a tone curve generated by the tone-curve generating unit 15.

Furthermore, the color-space converting unit 21 reads out the processing object image corrected by the image correcting unit 16 from the storage unit 14, and converts the corrected processing object image into the original color space. The corrected processing object image subjected to the conversion into the original color space by the color-space converting unit 21 is transmitted to the storage unit 14 via the bus 18 and temporarily stored in the storage unit 14. In the second embodiment, the image output unit 17 reads out the corrected processing object image subjected to the conversion into the original color space from the storage unit 14, and outputs the read processing object image to a predetermined output destination or an output destination specified by a user.

Figure 14:
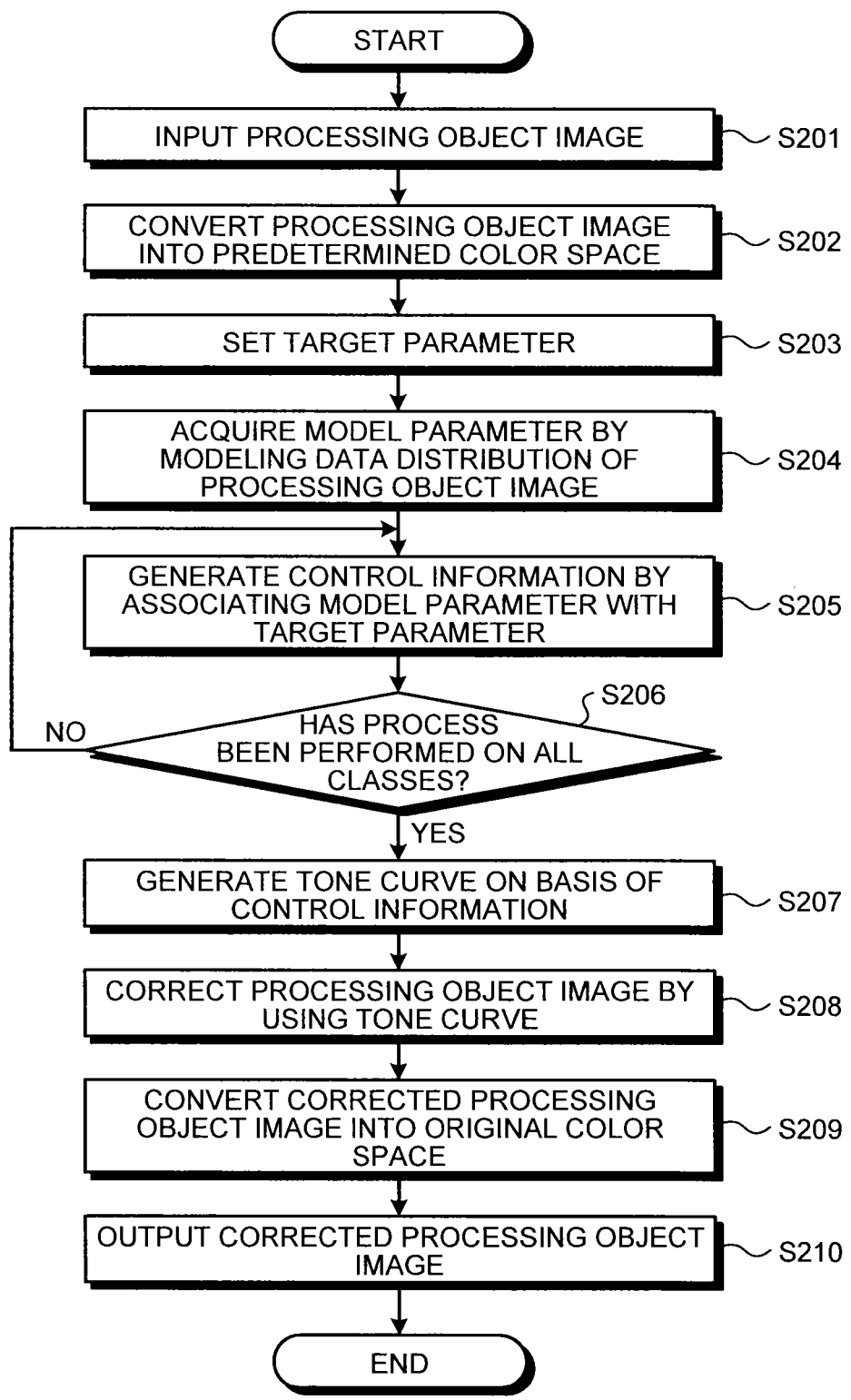
FIG. 14 is a flowchart illustrating operation of the image processing apparatus according to the second embodiment.

FIG. 14 is a flowchart illustrating operation of the image processing apparatus according to the second embodiment. A process performed by the units included in the image processing apparatus according to the second embodiment is explained below in line with the flowchart shown in FIG. 14.

First, a processing object image specified by a user is input through the image input unit 11 in the same manner as the first embodiment (Step S201).

Next, the color-space converting unit 21 converts the processing object image input at Step S201 into a different color space from an original color space (Step S202). Examples of the color space include sRGB color space, CIE-XYZ color space, and CIE-L*a*b* color space, etc. Which color space the processing object image is converted into can be determined in advance; alternatively, candidate color spaces for the color space conversion can be presented to a user, and the processing object image can be converted into a color space selected by the user from the candidate color spaces. Furthermore, a color space into which the processing object image is converted can be automatically selected in accordance with a feature of data distribution of the input processing object image. As an example of a method of automatically selecting a color space into which the processing object image is converted, a method of selecting a color space in which the distribution of pixel values is most dispersed or a method of selecting a color space in which the distribution approximates the intended shape (for example, multimodal distribution), etc. can be used.

Next, the target-parameter setting unit 12 sets a target parameter in the same manner as the first embodiment (Step S203). However, in the second embodiment, the target-parameter setting unit 12 sets a target parameter representing a feature of a target image in the converted color image.

Next, the image analyzing unit 13 acquires a model parameter by modeling data distribution of the processing object image subjected to the color space conversion at Step S202 with a probability distribution model (Step S204). A method of the modeling is the same as the first embodiment.

Next, the tone-curve generating unit 15 generates control information by associating the model parameter acquired by the modeling at Step S204 with the target parameter set at Step S203 with respect to each of classes such as highlight, medium tone, and shadow in the same manner as the first embodiment (Steps S205 and S206).

Then, the tone-curve generating unit 15 generates a tone curve for correcting the processing object image on the basis of the control information generated at Step S205 in the same manner as the first embodiment (Step S207).

Next, the image correcting unit 16 corrects the processing object image subjected to the color space conversion by using the tone curve generated at Step S207 in the same manner as the first embodiment (Step S208).

Next, the color-space converting unit 21 converts the processing object image corrected at Step S208 into the original color space (Step S209). Incidentally, if output of the corrected processing object image remaining in the converted color space is requested, the process at Step S209 is omitted. Furthermore, if output of the processing object image in a different color space from those at the time of input and at the time of correction is requested, the corrected processing object image is converted into not the original color space but the different color space.

Next, the image output unit 17 outputs the corrected processing object image in the same manner as the first embodiment (Step S210).

Incidentally, the processes at Steps S203 to S208 in FIG. 14 can be performed with respect to each channel separately in the same manner as the first embodiment, or can be performed only on a specific channel.

As described above, the image processing apparatus according to the second embodiment can perform a correction (a tone conversion) using a tone curve on a processing object image in a different color space from an original color space; therefore, it is possible to achieve an appropriate correction according to purpose of the correction. For example, when a tone conversion of only a brightness component is performed on a processing object image in sRGB color space, the image processing apparatus converts the processing object image into a color space in which the processing object image is separated into a brightness component and a chromaticity component (for example, CIE-L*a*b* color space), and generates a tone curve only for an L* channel, and corrects the processing object image by using the tone curve, and then converts the corrected processing object image into the original sRGB color space. Furthermore, the image processing apparatus converts the processing object image into a color space showing no correlation between the axes of the color space (for example, CIE-L*a*b* color space), perform a correction (a tone conversion) using a tone curve with respect to each channel separately, and thereby can prevent an unexpected color registration error.

Third Embodiment

Subsequently, an image processing apparatus according to a third embodiment is explained. The third embodiment is an example where multidimensional data distribution of a processing object image is modeled with a multidimensional probability distribution model. That is, unlike the first embodiment in which a processing object image is modeled with respect to each dimension separately, the multidimensional data distribution is modeled with a multidimensional model (the dimension of the model is lower than or equal to the dimension of the data distribution). Incidentally, unlike the first embodiment, the third embodiment is based on the premise that a processing object image is a color image (a multichannel image).

A configuration of the image processing apparatus according to the third embodiment is the same as that of the image processing apparatus according to the first embodiment illustrated in the functional block diagram in FIG. 1. Furthermore, the basic operation of the image processing apparatus according to the third embodiment is the same as that of the image processing apparatus according to the first embodiment illustrated in the flowchart in FIG. 2. However, in the third embodiment, data to be handled has multiple dimensions; therefore, the third embodiment goes through changes according to that. A process performed by units included in the image processing apparatus according to the third embodiment is explained below with reference to the flowchart shown in FIG. 2.

First, a processing object image specified by a user is input through the image input unit 11 in the same manner as the first embodiment (Step S101).

Next, the target-parameter setting unit 12 sets a target parameter representing a feature of a target image (Step S102). In the first embodiment, data distribution of a processing object image is one-dimensionally projected and then modeled; therefore, a target parameter is given as a set of one or more values (scalar quantities) per class. On the other hand, in the third embodiment, data distribution of a processing object image is multidimensionally modeled; therefore, each element in a target parameter is a vector or a matrix.

For example, assume that in sRGB color space, the data distribution of the processing object image is modeled with a mixture Gaussian distribution, and respective averages of Gaussian distributions are given as a target parameter. In the first embodiment, data distribution is projected onto the axes of the color space; therefore, the data distribution is modeled with a mixture Gaussian distribution consisting of multiple one-dimensional Gaussian distributions. Therefore, one scalar quantity per Gaussian distribution is assigned as a target parameter. On the other hand, in the third embodiment, the data distribution is modeled in n dimensions (higher than or equal to one dimension, lower than or equal to the dimension of the color space); therefore, the average of each Gaussian distribution is an n-dimensional vector. Accordingly, a target parameter consists of multiple n-dimensional vectors (if n=1, multiple scalar quantities in the same manner as the first embodiment).

Next, the image analyzing unit 13 acquires a model parameter by modeling the data distribution of the processing object image input at Step S101 with a probability distribution model (Step S103). As described above, data handled in the third embodiment has multiple dimensions, and a model used in the modeling has multiple dimensions; therefore, a model parameter acquired by modeling the processing object image also has corresponding multiple dimensions. For example, when the data distribution is modeled with an m-dimensional mixture Gaussian distribution, the average and variance which are model parameters of each Gaussian distribution are an m-dimensional vector and an m×m matrix (variance-covariance matrix), respectively.

Next, the tone-curve generating unit 15 generates control information by associating the model parameter acquired by the modeling at Step S103 with the target parameter set at Step S102 with respect to each class (Steps S104 and S105). In the third embodiment, average vectors are associated with each other, so control information is a set of a pair of two average vectors. Therefore, the control information as a set of pairs of average vectors is obtained. Incidentally, the number of elements included in the set is equal to the number of classes, which means the number of elements included in the set coincides with the number of mixed models used in the modeling.

Then, the tone-curve generating unit 15 generates a tone curve for correcting the processing object image on the basis of the control information generated at Step S104 (Step S106). As described above, the control information is given as a pair of vectors. The tone curve can be generated in the same dimension as the color space, or multiple tone curves in lower dimensions than the color space can be generated. For example, when the average vectors included in the control information are m-dimensional vectors, the tone curve can be generated as an m-dimensional curve, or can be generated as separate curves for the axes of the color space. In the former case, the calculation becomes complex because it is necessary to extend an interpolation function to an m-dimensional function; however, it is possible to approximate the tone curve by representing the tone curve as superposition of m one-dimensional curves. In this case, when the one-dimensional curves are superposed, elements of the m-dimensional average vectors are sequentially extracted, and the tone curve is generated in the same manner as the first embodiment.

Next, the image correcting unit 16 corrects the processing object image by using the tone curve generated at Step S106 (Step S107). At this time, if the tone curve generated at Step S106 is a one-dimensional tone curve, the image correcting unit 16 performs a tone conversion on each channel separately. On the other hand, if the tone curve generated at Step S106 is a multidimensional tone curve, the image correcting unit 16 performs a tone conversion on multiple channels collectively.

Next, the image output unit 17 outputs the processing object image corrected at Step S107 in the same manner as the first embodiment (Step S108).

In the third embodiment, the dimension of a probability distribution model with which data distribution is modeled only has to be higher than one dimension and lower than the dimension of the data distribution. Furthermore, the data distribution can be mapped in multiple color spaces whose dimensions are lower than the dimension of the data distribution and then modeled in the multiple color spaces. Specifically, it is known that RGB values of an image are correlated to one another; therefore, when the data distribution is modeled in sRGB color space, a three-dimensional probability distribution model is deemed to be used; and when the data distribution is modeled in CIE-L*a*b* color space showing a poor correlation between the axes, the data distribution is projected onto the axes, and a one-dimensional probability distribution model is deemed to be used separately. Furthermore, if a user wants to correct the brightness and chromaticity of the processing object image separately, the processing object image can be corrected in such a way that the data distribution of the processing object image is modeled in one dimension, for example, along the L* axis in CIE-L*a*b* color space, and modeled in two dimensions on the *a*b* plane.

As described above, the image processing apparatus according to the third embodiment models data distribution of a processing object image with a multidimensional probability distribution model, and therefore can model the data distribution with high precision even under a condition that there is a correlation between the axes consisting a color space. Accordingly, it is also possible to generate a two or higher-dimensional tone curve appropriately. Furthermore, as described above, data distribution of a processing object image in a multidimensional color space (for example, three-dimensional CIE-L*a*b* color space) can be mapped in a lower-dimensional color space (for example, the L* axis and the *a*b* plane) according to respective implications of the axes, and then modeled in the lower-dimensional color space. Accordingly, it is possible to achieve an appropriate correction according to purpose of the correction, for example, to correct the brightness and chromaticity of the processing object image separately.

Fourth Embodiment

Subsequently, an image processing apparatus according to a fourth embodiment is explained. The fourth embodiment is an example where a model parameter obtained by modeling a reference image to be the goal of correction in the same manner as a processing object image is set as a target parameter. Except for a target-parameter setting process, the flow of basic processing is the same as the first and third embodiments, so the fourth embodiment is explained below with a focus on parts characteristic of the fourth embodiment, and overlapping description with the first and third embodiments is appropriately omitted.

Figure 15:
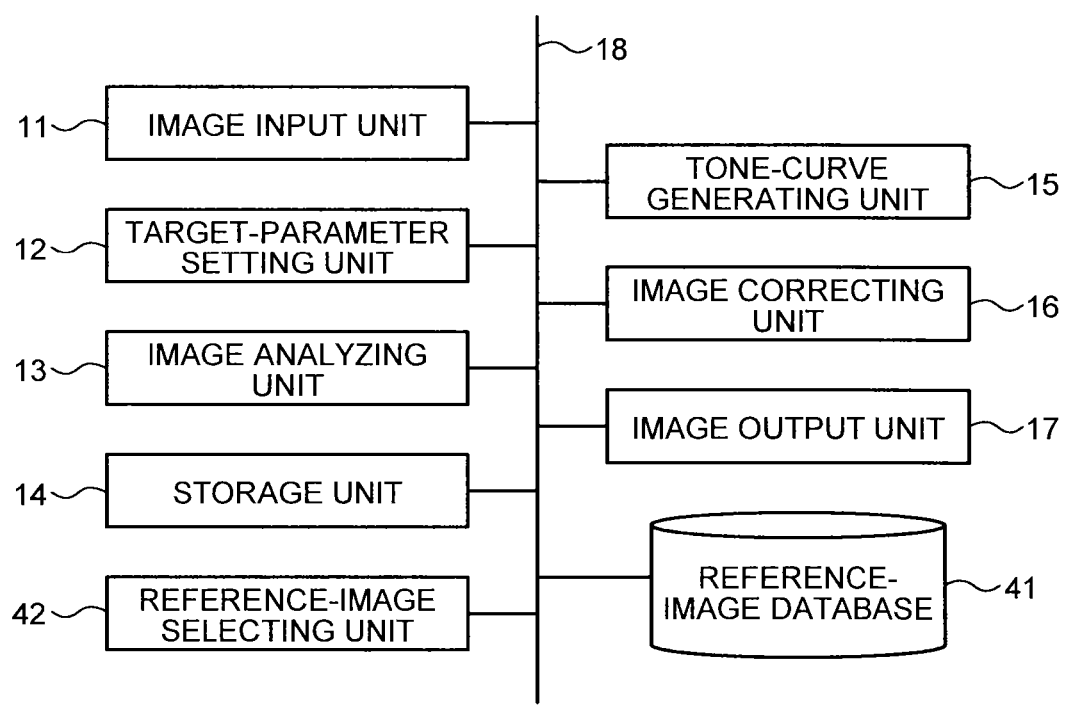
FIG. 15 is a functional block diagram showing a configuration of an image processing apparatus according to a fourth embodiment.

FIG. 15 is a functional block diagram showing a configuration of the image processing apparatus according to the fourth embodiment. As shown in FIG. 15, the configuration of the image processing apparatus according to the fourth embodiment is that a reference-image database 41 and a reference-image selecting unit 42 are added to the configuration of the image processing apparatus according to the first embodiment.

The reference-image database 41 is a database that stores therein multiple candidate images for a reference image. The images stored in the reference-image database 41 can be registered in advance or registered by a user.

The reference-image selecting unit 42 selects one or more reference images from among the multiple images stored in the reference-image database 41. The reference image(s) selected by the reference-image selecting unit 42 is transmitted to the storage unit 14 via the bus 18 and temporarily stored in the storage unit 14.

In the fourth embodiment, the image analyzing unit 13 reads out not only a processing object image but also a reference image selected by the reference-image selecting unit 42 from the storage unit 14, and acquires a model parameter by modeling data distribution of the reference image. Then, the target-parameter setting unit 12 sets the model parameter acquired by the modeling of the reference image as a target parameter.

Figure 16:
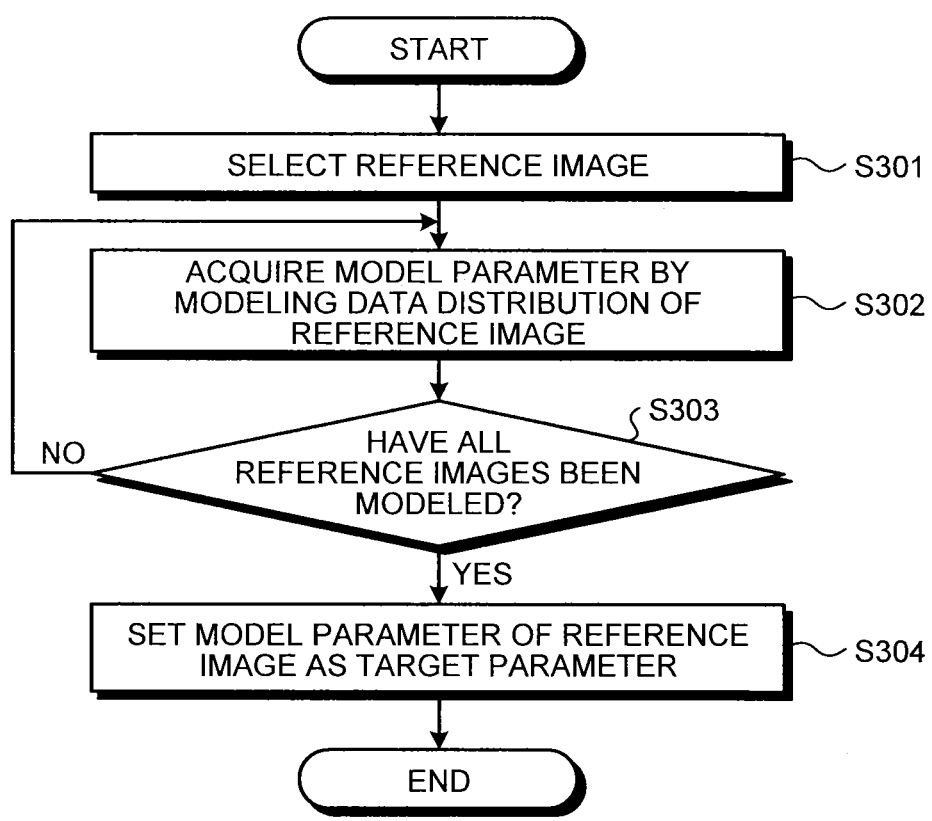
FIG. 16 is a flowchart illustrating details of a target-parameter setting process performed by the image processing apparatus according to the fourth embodiment.

FIG. 16 is a flowchart illustrating details of a target-parameter setting process (Step S102 in FIG. 2) performed by the image processing apparatus according to the fourth embodiment. The basic operation of the image processing apparatus according to the fourth embodiment is identical to the operation of the image processing apparatus according to the first embodiment (the third embodiment) illustrated in the flowchart in FIG. 2, so only the target-parameter setting process characteristic of the fourth embodiment is explained below in line with the flowchart shown in FIG. 16.

In the fourth embodiment, when a target parameter is set, first, the reference-image selecting unit 42 selects one or more reference images from among multiple images stored in the reference-image database 41 (Step S301). The reference-image selecting unit 42 can automatically select reference image(s) from among the multiple images stored in the reference-image database 41, or can receive a user operation to specify an arbitrary image from among the multiple images stored in the reference-image database 41 and select the reference image specified by the user. As a method of automatically selecting reference image(s), for example, a technology for similar image retrieval can be used. The similar image retrieval is a technology to select an image on the basis of a similarity in feature between images, and can select a reference image similar in image feature to the processing object image. Incidentally, the similar image retrieval is a well-known technology, so detailed description is omitted.

Incidentally, as the reference image, not only an image stored in the reference-image database 41 but also an arbitrary image specified by a user can be used. In this case, a reference image specified by a user is input through the image input unit 11 together with a processing object image specified by the user. The input of the reference image can be performed by reading out the image stored in, for example, recording media, such as a CD, a DVD, and a hard disk, or network storage, or can be performed by causing an image reading unit such as a scanner (not shown) to read out the image from a sheet of an original or a film.

Next, the image analyzing unit 13 acquires a model parameter by modeling data distribution of the reference image selected at Step S301 with a probability distribution model (Step S201). The procedure for the modeling is the same as in the case where data distribution of the processing object image is modeled, so description is omitted. When multiple reference images are selected at Step S301, whether all the reference images have been modeled is determined (Step S303), and the process at Step S302 is repeatedly performed until all the reference images have been modeled (NO at Step S303). Incidentally, the process on the multiple reference images can be configured to acquire multiple model parameters by modeling data distributions of the multiple reference images individually, or can be configured to acquire one model parameter by integrating data distributions of the all reference images and modeling the integrated data distribution.

Next, the target-parameter setting unit 12 sets the model parameter acquired by the modeling of the reference image at Step S302 as a target parameter (Step S304). Even if the reference-image selecting unit 42 has selected either only one reference image or multiple reference images, when the image analyzing unit 13 has integrated data distributions of multiple reference images and modeled the integrated data distribution, one model parameter is acquired. Therefore, in this case, this model parameter is set as a target parameter. On the other hand, when the reference-image selecting unit 42 has selected multiple reference images, and the image analyzing unit 13 has modeled data distributions of the multiple reference images individually, multiple model parameters are acquired. Therefore, in this case, these model parameters are integrated into one model parameter, and this model parameter is set as a target parameter. Methods for the integration include, for example, a method of taking the arithmetic average of distribution parameters belonging to the same class in the multiple model parameters, a method of taking the median, and a method of adopting a parameter of a specific reference image specified in advance with respect to each class, etc.

The target parameter is set by using multiple reference images; therefore, even if an ideal image as a target image does not exist in the reference-image database 41, the almost ideal target parameter can be acquired. Furthermore, a target parameter can be set by using a different reference image for each class, for example, in such a way that a target parameter of a highlight portion is set by using a reference image A; a target parameter of a shadow portion is set by using a reference image B; and a target parameter of a medium tone portion is set by using reference images C and D. Accordingly, the degree of freedom in setting of a target parameter can be increased.

Incidentally, a model parameter can be obtained in advance, and an image to be stored in the reference-image database 41 can be stored to be associated with the model parameter. In this case, if the reference-image selecting unit 42 acquires a model parameter associated with an image selected as a reference image and stores the acquired model parameter in the storage unit 14, the process at Step S302

As described above, the image processing apparatus according to the fourth embodiment sets a target parameter by using a reference image; therefore, even when a user having no knowledge about parameters uses the image processing apparatus, an optimum tone curve for a processing object image can be easily generated through intuitive user operation. Furthermore, an image that does not exist in the reference-image database 41 can be also used as a reference image; therefore, the degree of freedom in setting of a target parameter can be increased if a user introduces an arbitrary image. Moreover, a target parameter is set by using multiple reference images, so that even a target parameter that cannot be represented by a specific reference image can be set.

<Image Forming System>

The image processing apparatuses according to the present embodiments are described in detail above. The image processing apparatus according to any of the present embodiments can be implemented, for example, as a component of an image forming system using a network.

Figure 17A:
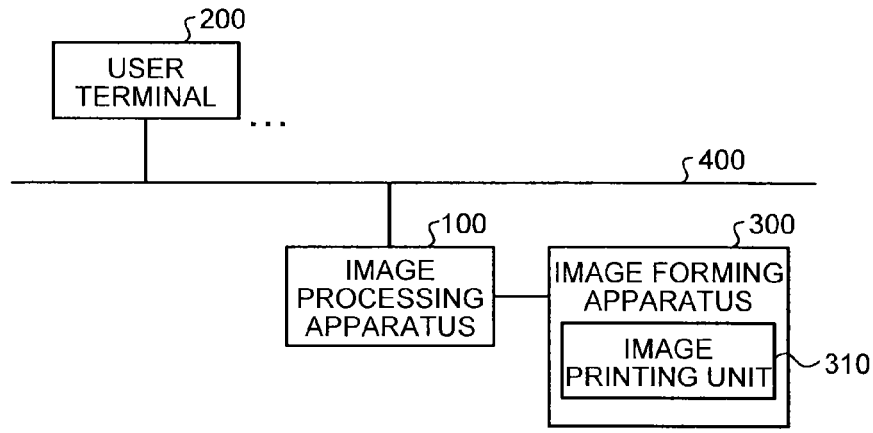
FIGS. 17A to 17C are diagrams illustrating variations of an image forming system.
Figure 17B:
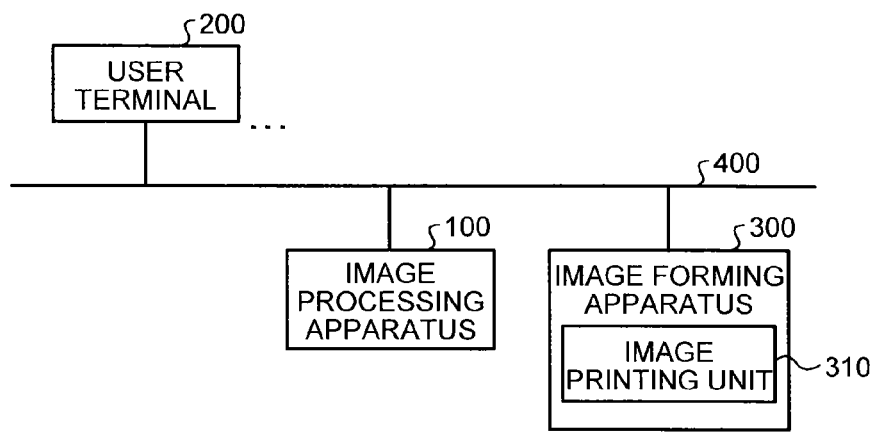
Figure 17C:
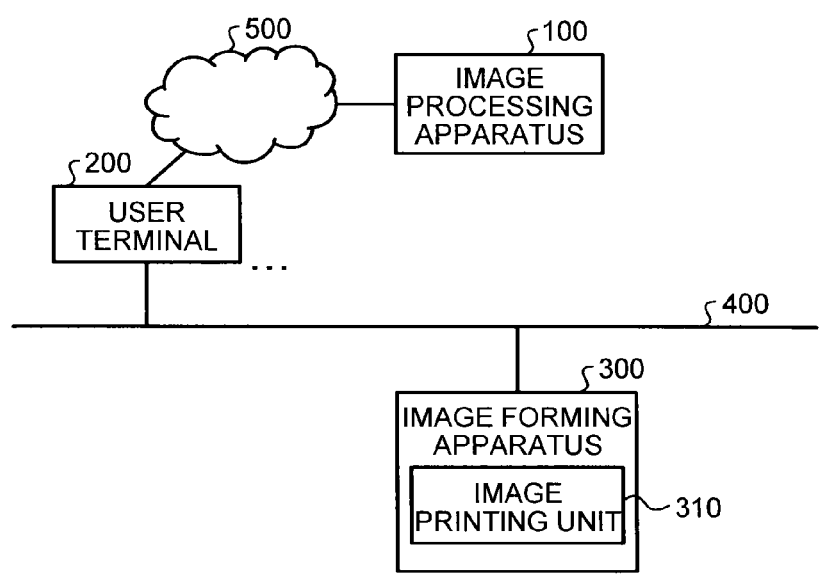

FIGS. 17A to 17C are diagrams illustrating variations of the image forming system. In an image forming system shown in FIG. 17A, an image processing apparatus 100 according to any of the present embodiments and a user terminal 200, such as a personal computer used by a user, are connected to a local network 400 such as a LAN. Then, an image forming apparatus 300 including an image printing unit 310 is directly connected to the image processing apparatus 100 on the local network 400. The image forming apparatus 300 is, for example, a printer, a copier, a multi-function peripheral, or the like.

In the image forming system shown in FIG. 17A, a processing object image specified by the user through the user terminal 200 is transmitted from the user terminal 200 to the image processing apparatus 100 via the local network 400. The image processing apparatus 100 receives the processing object image transmitted from the user terminal 200 via the local network 400, and generates a tone curve by modeling data distribution of the received processing object image, and then corrects the processing object image by using the generated tone curve. The corrected processing object image is transmitted from the image processing apparatus 100 to the image forming apparatus 300, and is printed out by the image printing unit 310 of the image forming apparatus 300.

In an image forming system shown in FIG. 17B, the image processing apparatus 100 according to any of the present embodiments, the user terminal 200, and the image forming apparatus 300 including the image printing unit 310 are connected to the local network 400.

In the image forming system shown in FIG. 17B, a processing object image specified by the user through the user terminal 200 is transmitted from the user terminal 200 to the image processing apparatus 100 via the local network 400. The image processing apparatus 100 receives the processing object image transmitted from the user terminal 200 via the local network 400, and generates a tone curve by modeling data distribution of the received processing object image, and then corrects the processing object image by using the generated tone curve. The corrected processing object image is transmitted from the image processing apparatus 100 to the image forming apparatus 300 via the local network 400. The image forming apparatus 300 receives the processing object image transmitted from the image processing apparatus 100 via the local network 400, and the image printing unit 310 prints out the received processing object image.

In an image forming system shown in FIG. 17C, the user terminal 200 and the image forming apparatus 300 including the image printing unit 310 are connected to the local network 400. Then, the image processing apparatus 100 according to any of the present embodiments exists on a global network 500 such as the Internet. The user terminal 200 is configured to be able to communicate with the image processing apparatus 100 on the global network 500.

In the image forming system shown in FIG. 17C, a processing object image specified by the user through the user terminal 200 is transmitted to the image processing apparatus 100 via the global network 500. The image processing apparatus 100 receives the processing object image transmitted from the user terminal 200 via the global network 500, and generates a tone curve by modeling data distribution of the received processing object image, and then corrects the processing object image by using the generated tone curve. The corrected processing object image is transmitted from the image processing apparatus 100 to the user terminal 200 via the global network 500. The user terminal 200 receives the corrected processing object image transmitted from the image processing apparatus 100 via the global network 500, and transmits the received processing object image to the image forming apparatus 300 via the local network 400. The image forming apparatus 300 receives the processing object image transmitted from the image processing apparatus 100 via the local network 400, and the image printing unit 310 prints out the received processing object image.

The image processing apparatus 100 according to any of the present embodiments can be applied to any of the image forming systems shown in FIGS. 17A to 17C. Furthermore, by installing a program that realizes the functions of the image processing apparatus 100 according to any of the present embodiments on the user terminal 200, the image processing apparatus 100 can be realized as a function of the user terminal 200. In this case, the image forming apparatus 300 is directly connected to the user terminal 200 having the functions of the image processing apparatus 100, or the user terminal 200 having the functions of the image processing apparatus 100 and the image forming apparatus 300 are connected to the local network 400, and thereby an image forming system is constructed. Furthermore, it is also possible to construct an image forming system in which the image forming apparatus 300 is configured to be able to communicate with the image processing apparatus 100 on the global network 500, and the image processing apparatus 100 on the global network 500 corrects a processing object image specified by the user through the image forming apparatus 300.

<Image Forming Apparatus>

Furthermore, the image processing apparatus according to any of the present embodiments can be implemented as a function of an image forming apparatus.

Figure 18:
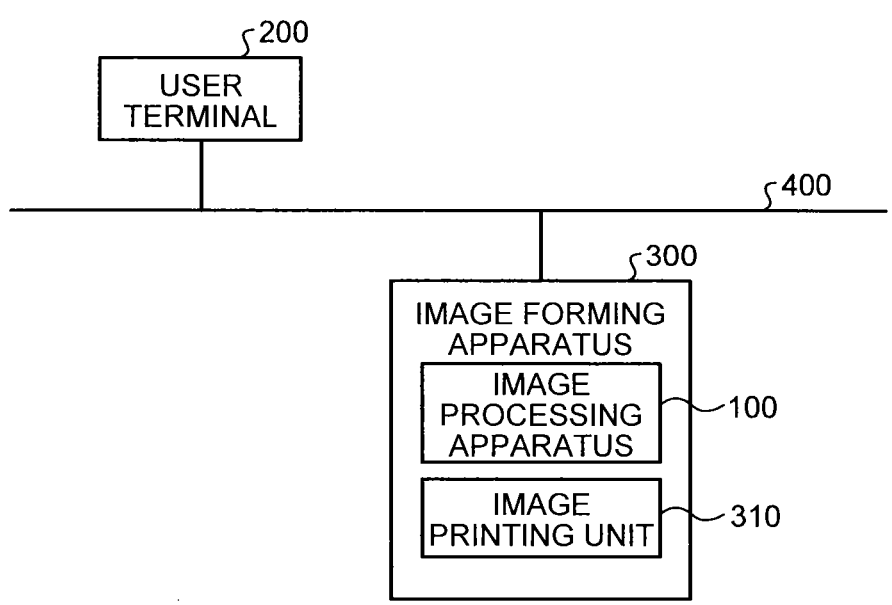
FIG. 18 is a diagram illustrating an example where the image processing apparatus is implemented as part of functions of an image forming apparatus.

FIG. 18 is a diagram illustrating an example where the image processing apparatus according to any of the present embodiments is implemented as part of functions of an image forming apparatus. In the example shown in FIG. 18, the user terminal 200 and the image forming apparatus 300 are connected to the local network 400. The image forming apparatus 300 includes the image printing unit 310, and has a function as the image processing apparatus 100 according to any of the present embodiments. Such a configuration can be achieved by installing a program that realizes the functions of the image processing apparatus 100 according to any of the present embodiments on the image forming apparatus 300 or by incorporating dedicated hardware for realizing the functions of the image processing apparatus 100 according to any of the present embodiments into the image forming apparatus 300.

In the example shown in FIG. 18, a processing object image specified by the user through the user terminal 200 is transmitted from the user terminal 200 to the image forming apparatus 300 via the local network 400. The image forming apparatus 300 receives the processing object image transmitted from the user terminal 200 via the local network 400. Then, the image processing apparatus 100 in the image forming apparatus 300 generates a tone curve by modeling data distribution of the received processing object image, and corrects the processing object image by using the generated tone curve. Then, the image printing unit 310 prints out the processing object image corrected by the image processing apparatus 100.

Program

As described above, the image processing apparatus according to any of the present embodiments adopts a hardware configuration using, for example, a general computer, and function components, such as the image input unit 11, the target-parameter setting unit 12, the image analyzing unit 13, the tone-curve generating unit 15, the image correcting unit 16, the image output unit 17, the color-space converting unit 21, and the reference-image selecting unit 42, can be realized by a program executed by the computer, and the storage unit 14 and the reference-image database 41 can be realized by using a storage device or an external storage device.

The program causing the computer to realize the above-described function components is provided, for example, in such a way that the program is recorded on a computer-readable recording medium, such as a CD-ROM, a flexible disk (FD), a CD-R, or a digital versatile disc (DVD), in an installable or executable file format. Furthermore, the program can be provided in such a way that the program is stored on a computer connected to a network such as the Internet so that a user can download the program via the network. Moreover, the program can be provided or distributed via a network such as the Internet. Furthermore, the program can be built into a ROM or the like in advance.

The program is composed of modules including the above-described units of the image processing apparatus according to any of the present embodiments (the image input unit 11, the target-parameter setting unit 12, the image analyzing unit 13, the tone-curve generating unit 15, the image correcting unit 16, the image output unit 17, the color-space converting unit 21, and the reference-image selecting unit 42, etc.); a CPU (a processor) as actual hardware reads out the program from the recording medium, and executes the program, and thereby the above units are loaded into the main memory and generated on the main memory.

According to an embodiment, a tone curve is generated on the basis of control information in which a model parameter obtained by modeling distribution of pixel values of a processing object image is associated with a target value of the model parameter; therefore, it is possible to easily generate an optimum tone curve for the processing object image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
circuitry configured to:
acquire a first plurality of values of a first model parameter by modeling a distribution of pixel values of an input image with a first probability distribution model, the first probability distribution model being a first mixed distribution model including a first plurality of distributions, and the first plurality of values corresponding to peak positions of the first plurality of distributions of the first mixed distribution model,
determine control points as references for determining a shape of a tone curve by associating the first plurality of values acquired from the input image to be processed with a second plurality of values of a second model parameter obtained by modeling distribution of pixel values of a reference image with a second probability distribution model in which a type and number of mixtures are same as the first mixed distribution model modeling the pixel values of the input image, the second probability distribution model being a second mixed distribution model including a second plurality of distributions, and the second plurality of values corresponding to peak positions of the second plurality of distributions of the second mixed distribution model, each control point associating the first model parameter of a class with the second model parameter of same class,
generate additional control points that associate maximum values and minimum values of a dynamic range of the input image and a dynamic range of the reference image,
generate the tone curve based on the determined control points and the generated additional control points, and
correct the input image to be processed by using the tone curve.

2. The image processing apparatus according to claim 1, wherein the circuitry is configured to:
categorize the distribution of pixel values of the input image and the reference image into multiple classes, and model the distribution of pixel values of the input image and the reference image with the first mixed distribution model and the second mixed distribution model, respectively, having a number of mixtures coinciding with a number of the classes, thereby acquiring respective model parameters of element models which are mixed elements of the first mixed distribution model and the second mixed distribution model, and
generate control information in which a corresponding model parameter of an element model corresponding to a class, acquired from the input image to be processed is associated with a target value of the corresponding model parameter, with respect to each of the classes, and generate the tone curve based on multiple pieces of the control information generated for respective classes.

3. The image processing apparatus according to claim 2, wherein the circuitry is configured to:
model the distribution of pixel values of the input image and the reference image with a mixture Gaussian distribution, and, with respect to each of Gaussian distributions which are mixed elements of the mixture Gaussian distribution, acquire at least an average value of a Gaussian distribution as the first model parameter, and generate the control information in which at least the average value of the Gaussian distribution corresponding to a class, acquired from the input image to be processed is associated with a target value of the average value, with respect to each of the classes, and generate the tone curve based on the multiple pieces of the control information generated for the respective classes.

4. The image processing apparatus according to claim 3, wherein the circuitry is configured to generate the multiple pieces of the control information so that a magnitude relationship between average values coincides with a magnitude relationship between target values among the multiple pieces of the control information generated for the respective classes.

5. The image processing apparatus according to claim 3, wherein the circuitry is configured to generate the tone curve by performing interpolation using the multiple pieces of the control information generated for the respective classes as the control points.

6. The image processing apparatus according to claim 5, wherein the circuitry is configured to correct positions of the control points by using respective variance values of the Gaussian distributions corresponding to the classes, acquired from the input image to be processed.

7. The image processing apparatus according to claim 5, wherein the circuitry is configured to generate the tone curve by a combination of multiple interpolation methods, and change respective rates of the interpolation methods applied to parts of the tone curve to be generated corresponding to the classes by using respective variance values of the Gaussian distributions corresponding to the classes, acquired from the input image to be processed.

8. The image processing apparatus according to claim 1, wherein the circuitry is configured to:
convert color space of the input image,
acquire the first model parameter from the input image to be processed subjected to color space conversion,
generate the tone curve based on control information in which the first model parameter acquired from the input image to be processed subjected to the color space conversion is associated with a target value of the first model parameter, and
correct the input image to be processed subjected to the color space conversion, by using the tone curve.

9. The image processing apparatus according to claim 1, wherein the circuitry is configured to:
acquire the first model parameter by modeling multidimensional distribution of pixel values with a multidimensional probability distribution model, and
generate a multidimensional tone curve.

10. The image processing apparatus according to claim 1, wherein the circuitry is configured to:
acquire the first model parameter by modeling the input image to be processed, and acquire the second model parameter by modeling the reference image, and
generate control information in which the second model parameter acquired from the reference image is set as a target value of the first model parameter acquired from the input image to be processed.

11. The image processing apparatus according to claim 10, further comprising:

a reference-image memory that stores therein multiple candidate images for the reference image, wherein the circuitry is configured to:
select one or more reference images from among the multiple candidate images stored in the reference-image memory, and
acquire the second model parameter by modeling the selected one or more reference images.

12. The image processing apparatus according to claim 11, wherein the circuitry is configured to select the one or more reference images similar to the input image to be processed from among the multiple candidate images stored in the reference-image memory.

13. The image processing apparatus according to claim 11, wherein the circuitry is configured to select the one or more reference images specified by a user from among the multiple candidate images stored in the reference-image memory.

14. An image forming system comprising:
an image processing apparatus; and
an image forming apparatus that is connected to the image processing apparatus so as to be able to communicate with each other, wherein
the image processing apparatus includes circuitry configured to:
acquire a first plurality of values of a first model parameter by modeling a distribution of pixel values of an input image with a first probability distribution model, the first probability distribution model being a first mixed distribution model including a first plurality of distributions, and the first plurality of values corresponding to peak positions of the first plurality of distributions of the first mixed distribution model,
determine control points as references for determining a shape of a tone curve by associating the first plurality of values acquired from the input image to be processed with a second plurality of values of a second model parameter obtained by modeling distribution of pixel values of a reference image with a second probability distribution model in which a type and number of mixtures are same as the first mixed distribution model modeling the pixel values of the input image, the second probability distribution model being a second mixed distribution model including a second plurality of distributions, and the second plurality of values corresponding to peak positions of the second plurality of distributions of the second mixed distribution model, each control point associating the first model parameter of a class with the second model parameter of same class,
generate additional control points that associate maximum values and minimum values of a dynamic range of the input image and a dynamic range of the reference image,
generate the tone curve based on the determined control points and the generated additional control points, and
correct the input image to be processed by using the tone curve, and
the image forming apparatus includes an image printer that prints out the corrected input image to be processed by the image processing apparatus.

15. A computer program product comprising a non-transitory computer-usable medium having computer-readable program codes embodied in the medium, wherein the program codes when executed cause a computer to realize a method comprising:

acquiring a first plurality of values of a first model parameter by modeling a distribution of pixel values of an input image with a first probability distribution model, the first probability distribution model being a first mixed distribution model including a first plurality of distributions, and the first plurality of values corresponding to peak positions of the first plurality of distributions of the first mixed distribution model;

determining control points as references for determining a shape of a tone curve by associating the first plurality of values acquired from the input image to be processed with a second plurality of values of a second model parameter obtained by modeling distribution of pixel values of a reference image with a second probability distribution model in which a type and number of mixtures are same as the first mixed distribution model modeling the pixel values of the input image, the second probability distribution model being a second mixed distribution model including a second plurality of distributions, and the second plurality of values corresponding to peak positions of the second plurality of distributions of the second mixed distribution model, each control point associating the first model parameter of a class with the second model parameter of same class;

generating additional control points that associate maximum values and minimum values of a dynamic range of the input image and a dynamic range of the reference image;

generating the tone curve based on the determined control points and the generated additional control points; and correcting the input image to be processed by using the tone curve.

16. The image processing apparatus according to claim 1, wherein a number of probability distribution models used for modeling the distribution of pixel values of the input image and the reference image is based on a number of classes into which the distribution of pixel values of the input image and the reference image are categorized, a shape of the distribution of pixel values of the input image, and a shape of the distribution of pixel values of the reference image.

17. An image processing apparatus comprising:
a processor configured to:

acquire a first plurality of values of a first model parameter by modeling a distribution of pixel values of an input image with a first probability distribution model, the first probability distribution model being a first mixed distribution model including a first plurality of distributions, and the first plurality of values corresponding to peak positions of the first plurality of distributions of the first mixed distribution model, determine control points as references for determining a shape of a tone curve by associating the first plurality of values acquired from the input image to be processed with a second plurality of values of a second model parameter obtained by modeling distribution of pixel values of a reference image with a second probability distribution model in which a type and number of mixtures are same as the first mixed distribution model modeling the pixel values of the input image, the second probability distribution model being a second mixed distribution model including a second plurality of distributions, and the second plurality of values corresponding to peak positions of the second plurality of distributions of the second mixed distribution model, each control point associating the first model parameter of a class with the second model parameter of same class, generate additional control points that associate maximum values and minimum values of a dynamic range of the input image and a dynamic range of the reference image, generate the tone curve based on the determined control points and the generated additional control points, and correct the input image to be processed by using the tone curve.

18. The image processing apparatus according to claim 2, wherein the multiple classes include highlight, medium tone, and shadow.

* * * * *